(12) United States Patent
Miyahara et al.

(10) Patent No.: US 10,464,553 B2
(45) Date of Patent: Nov. 5, 2019

(54) DRIVING ASSISTANCE DEVICE

(71) Applicant: MITSUBISHI ELECTRIC CORPORATION, Tokyo (JP)

(72) Inventors: Tadashi Miyahara, Tokyo (JP); Mitsuo Shimotani, Tokyo (JP); Satoru Inoue, Tokyo (JP); Yuki Sakai, Tokyo (JP); Yuji Karita, Tokyo (JP); Junichi Kimura, Tokyo (JP); Yoshio Sato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 110 days.

(21) Appl. No.: 15/748,721

(22) PCT Filed: Oct. 29, 2015

(86) PCT No.: PCT/JP2015/080473
§ 371 (c)(1),
(2) Date: Jan. 30, 2018

(87) PCT Pub. No.: WO2017/072894
PCT Pub. Date: May 4, 2017

(65) Prior Publication Data
US 2019/0009773 A1    Jan. 10, 2019

(51) Int. Cl.
*B60W 30/06* (2006.01)
*B60W 50/14* (2012.01)
(Continued)

(52) U.S. Cl.
CPC ............ *B60W 30/06* (2013.01); *B60W 50/14* (2013.01); *G05D 1/0088* (2013.01); *H04N 7/183* (2013.01);
(Continued)

(58) Field of Classification Search
CPC .. G08G 1/22; G08G 1/0965; G08G 1/096791; G08G 1/017; G08G 1/096716;
(Continued)

(56) References Cited

U.S. PATENT DOCUMENTS

| 9,704,396 B1* | 7/2017 | Owens | ................ G08G 1/0965 |
| 2011/0153532 A1* | 6/2011 | Kuge | .................... B60W 40/09 |
| | | | 706/12 |

(Continued)

FOREIGN PATENT DOCUMENTS

| JP | 2007-76496 A | 3/2007 |
| JP | 2007-237931 A | 9/2007 |

OTHER PUBLICATIONS

International Search Report, issued in PCT/JP2015/080473, dated Jan. 19, 2016.

*Primary Examiner* — Behrang Badii
(74) *Attorney, Agent, or Firm* — Birch, Stewart, Kolasch & Birch, LLP

(57) ABSTRACT

A driving assistance device includes a driving operation pattern storage in which a predetermined driving operation pattern is stored, an automatic driving controller configured to perform automatic driving of a vehicle in accordance with the driving operation pattern, a notification sequence storage configured to store a notification sequence corresponding to the driving operation pattern, and a notification processor configured to perform notification to a driver of the vehicle in accordance with the notification sequence. The notification sequence storage stores a plurality of notification sequences different in detail level for one driving operation pattern. When the automatic driving in accordance with the driving operation pattern is performed, the notification processor selects one of the plurality of notification sequences, and performs notification to the driver in accordance with (Continued)

the selected notification sequence in conformity with a progress of the relevant driving operation pattern in the automatic driving.

16 Claims, 26 Drawing Sheets

(51) Int. Cl.
*H04N 7/18* (2006.01)
*G05D 1/00* (2006.01)
*B60W 50/10* (2012.01)
*G08G 1/00* (2006.01)
*B60W 30/165* (2012.01)
*G01C 21/36* (2006.01)
*G08G 1/0965* (2006.01)
*B60W 30/00* (2006.01)
*G01C 21/34* (2006.01)
*B60W 40/09* (2012.01)
*G06Q 30/02* (2012.01)

(52) U.S. Cl.
CPC .......... *B60W 30/00* (2013.01); *B60W 30/165* (2013.01); *B60W 40/09* (2013.01); *B60W 50/10* (2013.01); *B60W 2050/146* (2013.01); *G01C 21/34* (2013.01); *G01C 21/3697* (2013.01); *G05D 1/00* (2013.01); *G05D 2201/0213* (2013.01); *G06Q 30/0226* (2013.01); *G08G 1/00* (2013.01); *G08G 1/0965* (2013.01); *G08G 1/22* (2013.01)

(58) Field of Classification Search
CPC ....... G08G 1/096741; G08G 1/096775; G08G 1/144; G08G 1/147; G08G 1/146; G08G 1/143; G01C 21/3697; B60W 40/09; B60W 30/06; B60W 30/143; B60W 30/165; B60W 30/00; B60W 50/10; B60W 50/14; B60W 50/0098; B60W 2050/146; B60W 30/146; B60W 50/0097; B60W 50/085; B60W 50/08; G06Q 30/0217; G06Q 30/0226; G06Q 40/08; G06Q 50/01; G06Q 20/127; G06Q 20/102; G06Q 20/42; G06Q 20/325; G07F 17/24; G05D 1/0295; G05D 1/0088; G05D 2201/0213; G07C 5/008; H04W 64/00; H04N 7/183; G07B 15/02
See application file for complete search history.

(56) References Cited

U.S. PATENT DOCUMENTS

| | | | |
|---|---|---|---|
| 2014/0226010 A1* | 8/2014 | Molin | G06Q 10/06 348/148 |
| 2016/0071418 A1* | 3/2016 | Oshida | G08G 1/22 701/23 |
| 2017/0016734 A1* | 1/2017 | Gupta | G01C 21/3697 |
| 2017/0279957 A1* | 9/2017 | Abramson et al. | H04M 1/72577 |
| 2017/0361853 A1* | 12/2017 | Nagy | B60W 50/14 |
| 2018/0079359 A1* | 3/2018 | Park | B60W 30/08 |
| 2018/0174446 A1* | 6/2018 | Wang | G08G 1/0112 |
| 2018/0215360 A1* | 8/2018 | Nakagawa | B60W 30/146 |

* cited by examiner

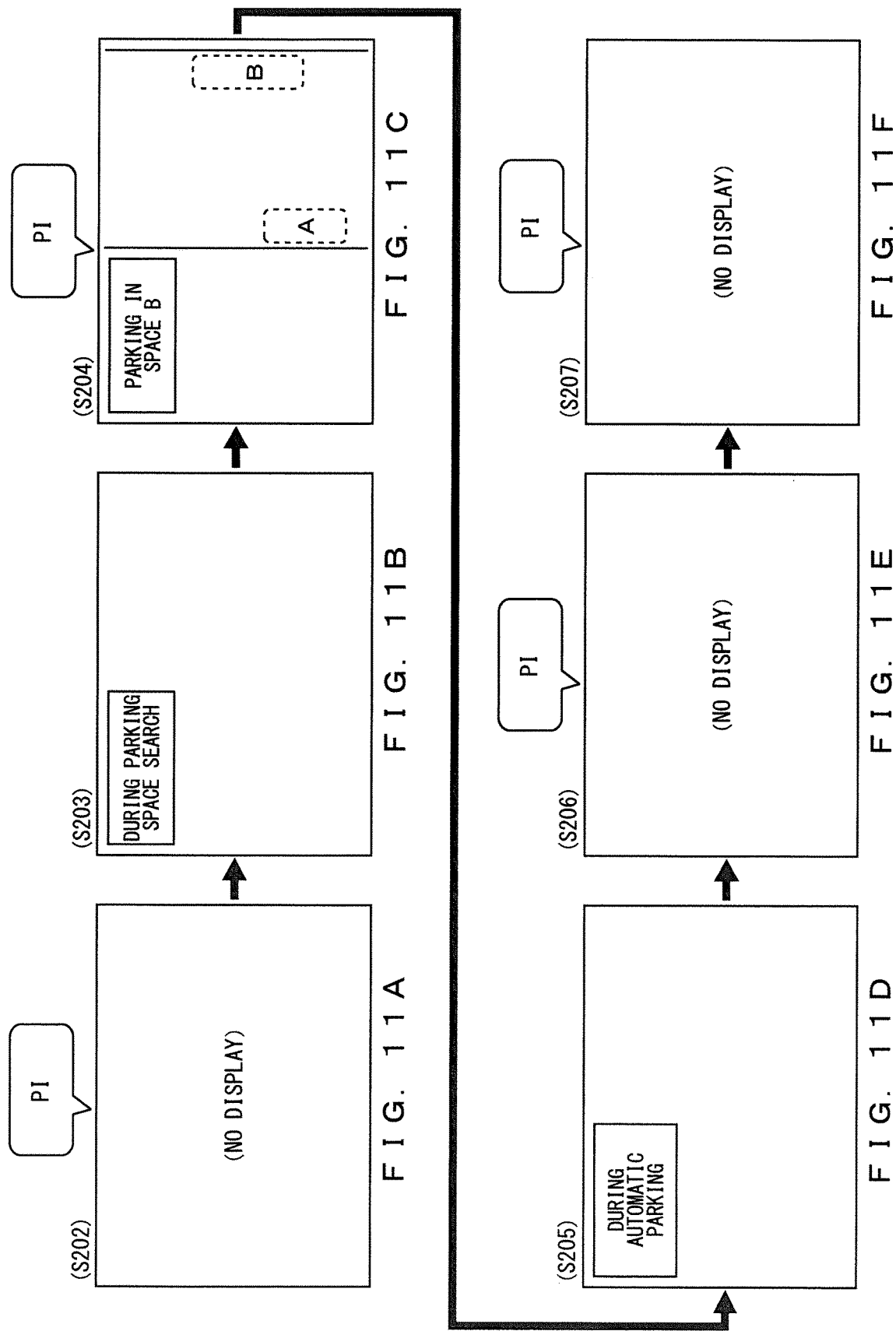

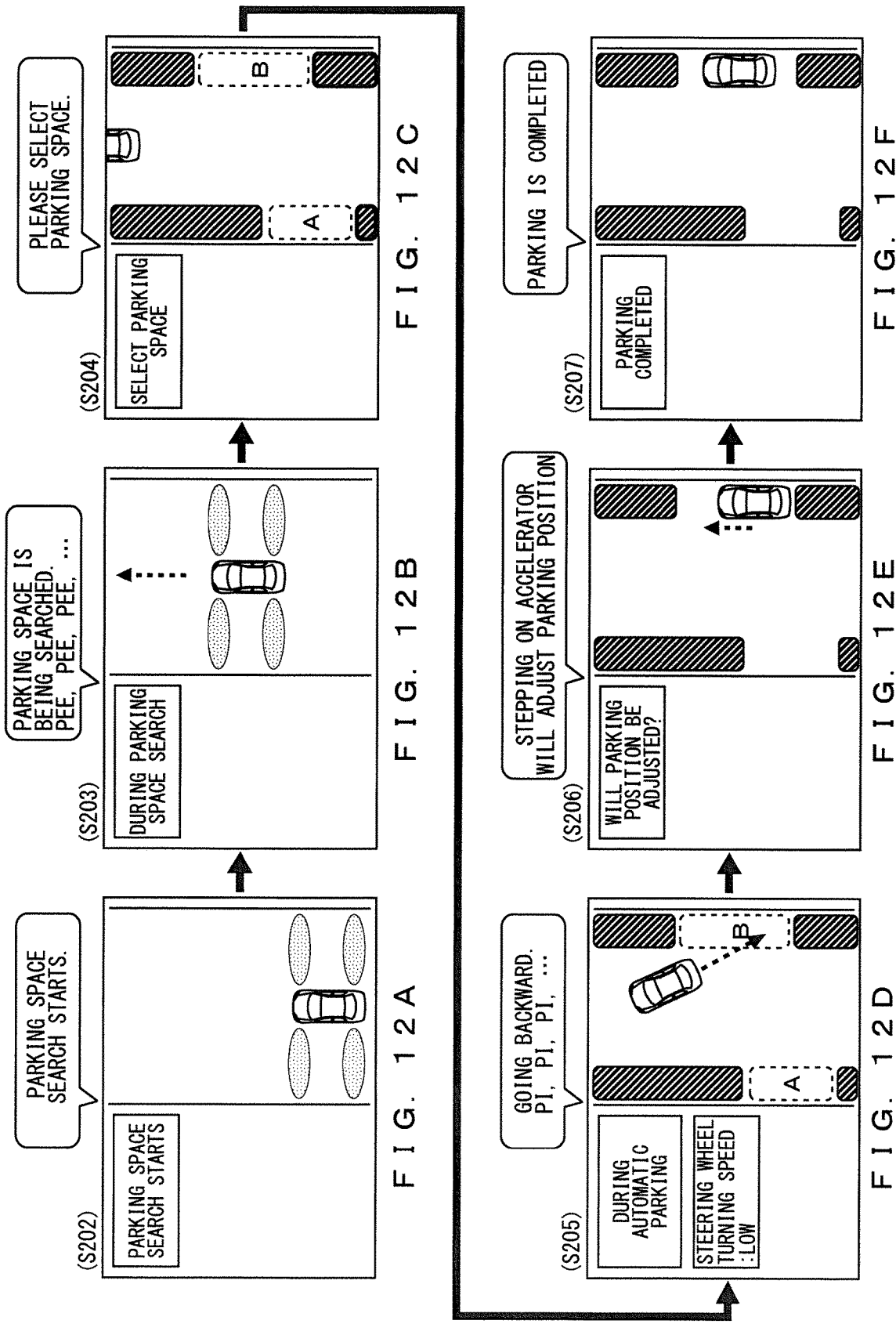

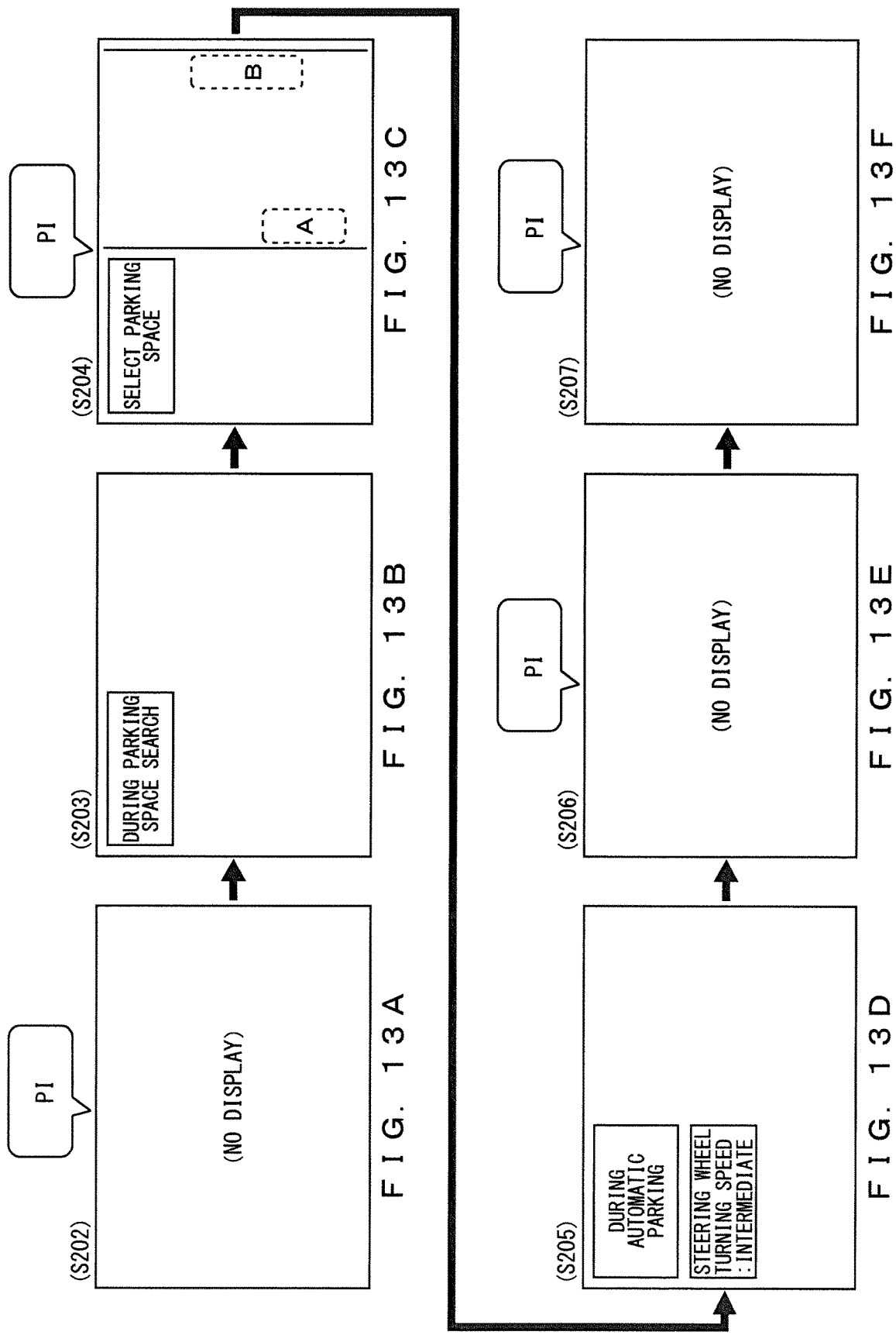

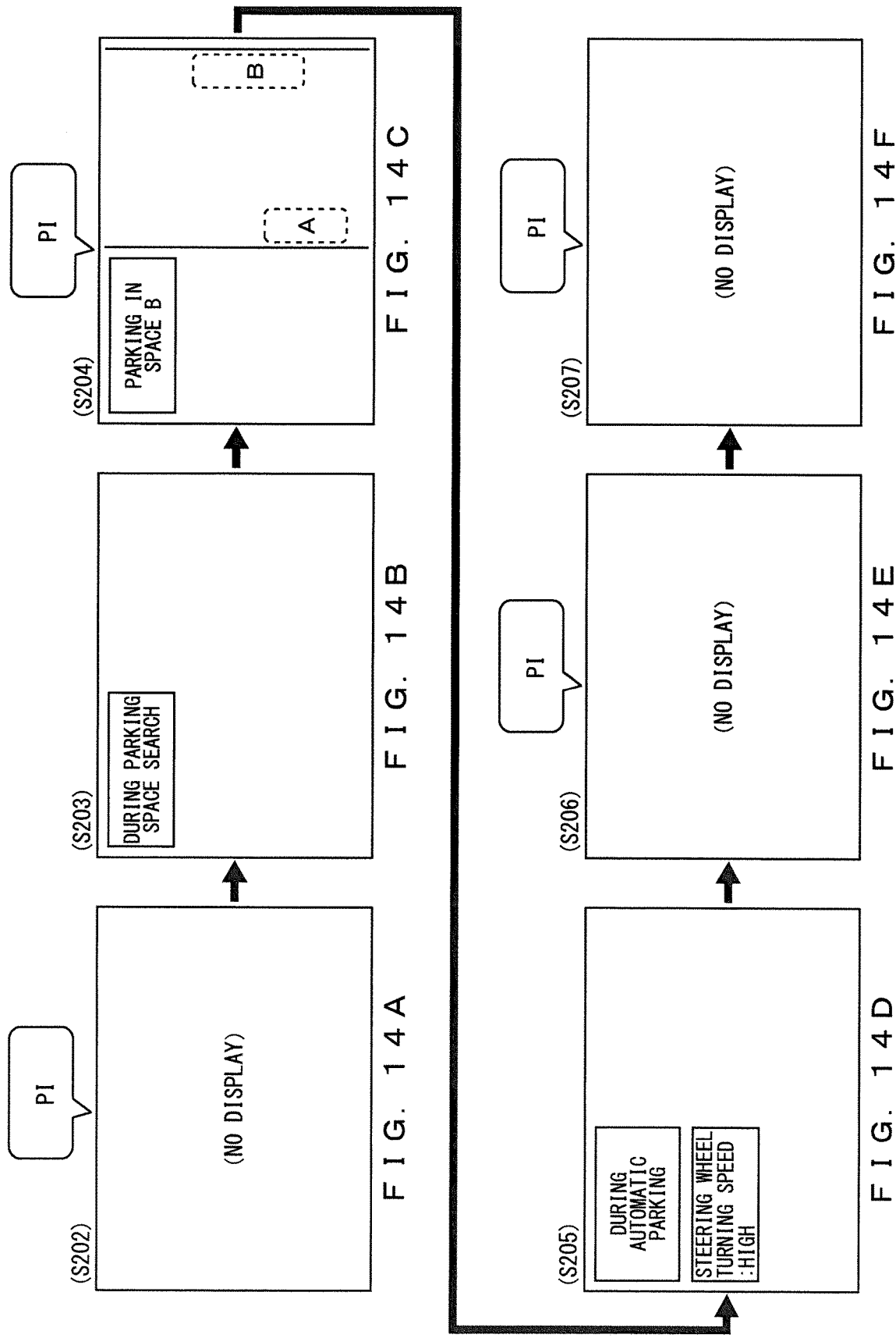

F I G . 1 5
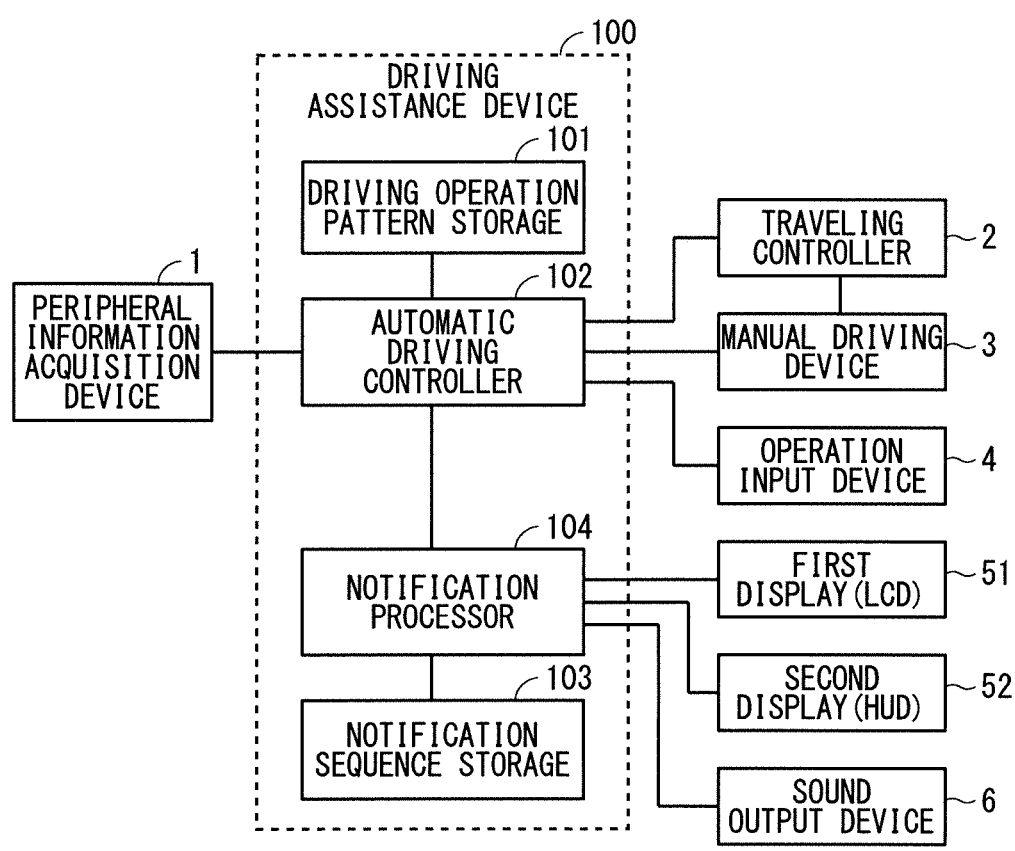

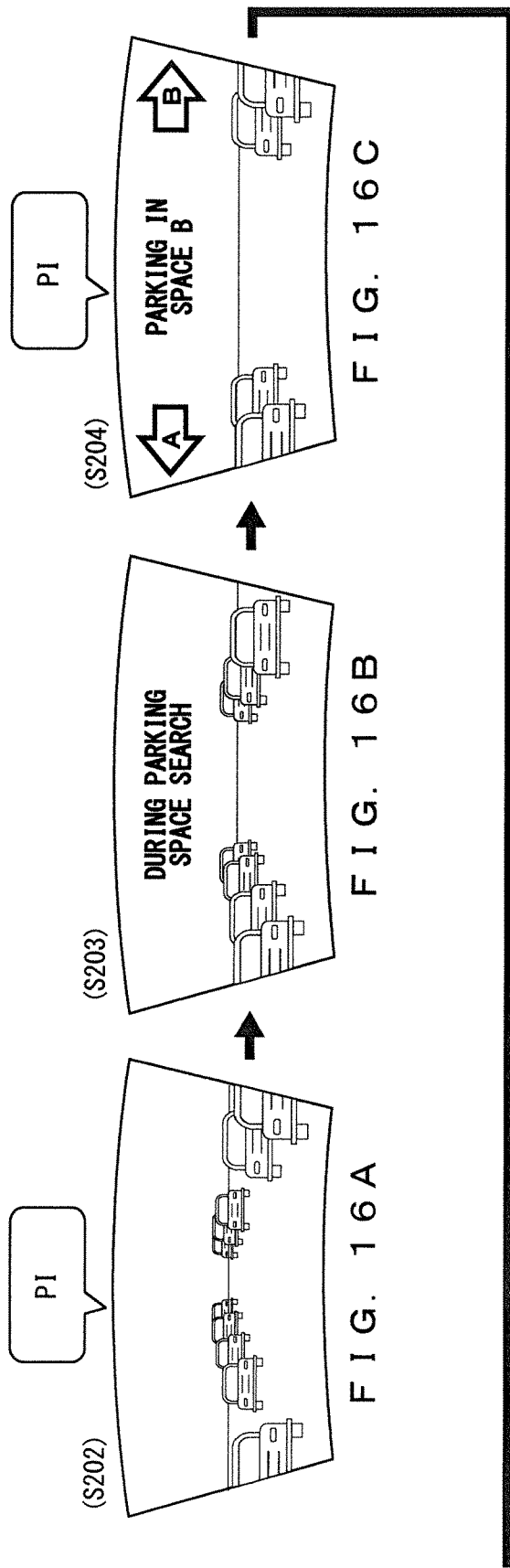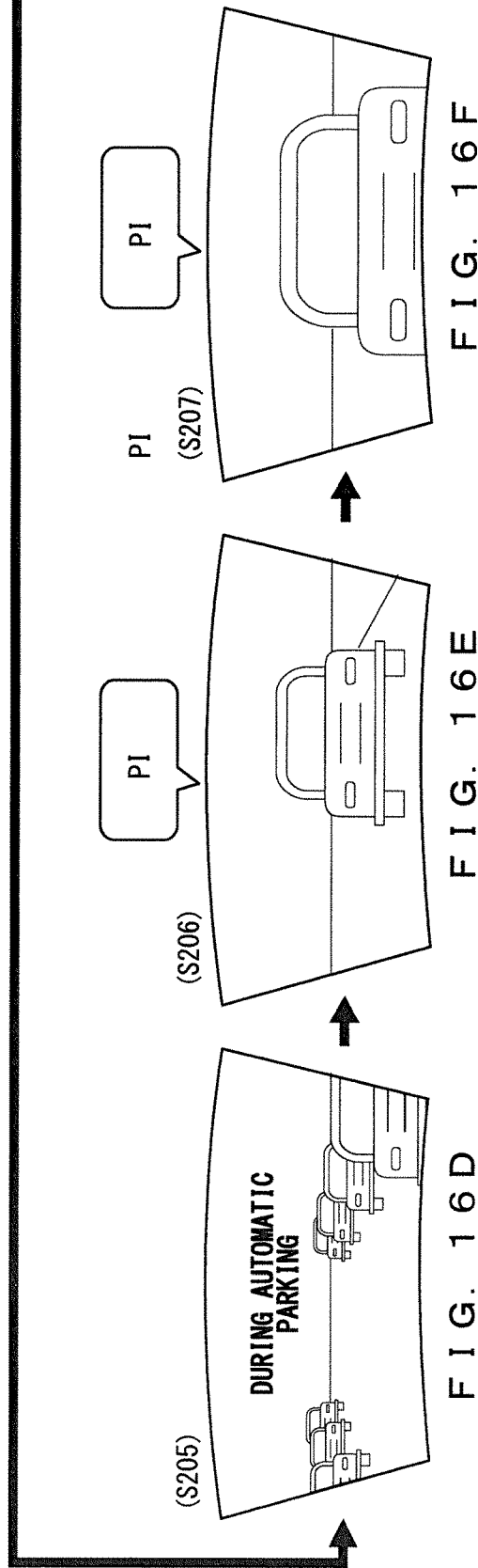

FIG. 22

```
NOTIFICATION SEQUENCE MENU

NOTIFICATION SEQUENCE CHANGE

NOTIFICATION SEQUENCE REPRODUCTION

NOTIFICATION SEQUENCE DIFFERENCE DESCRIPTION

NOTIFICATION SEQUENCE CUSTOMIZATION

NOTIFICATION SEQUENCE DOWNLOAD
```

FIG. 23

```
NOTIFICATION SEQUENCE CHANGE

DETAILED NOTIFICATION SEQUENCE

NORMAL NOTIFICATION SEQUENCE

BRIEF NOTIFICATION SEQUENCE

RETURN
```

FIG. 24

NOTIFICATION SEQUENCE DIFFERENCE DESCRIPTION

DETAIL → NORMAL

NORMAL → BRIEF

RETURN

FIG. 25

RETURN NOTIFICATION SEQUENCE COMPARISON

| | SPACE SEARCH START | DURING SPACE SEARCH | SPACE SELECTION | AUTOMATIC PARKING EXECUTION | PARKING POSITION ADJUSTMENT | AUTOMATIC PARKING COMPLETION |
|---|---|---|---|---|---|---|
| DETAIL | ▨ | | | | ▨ | ▨ |
| NORMAL | NO DISPLAY | | | | NO DISPLAY | NO DISPLAY |

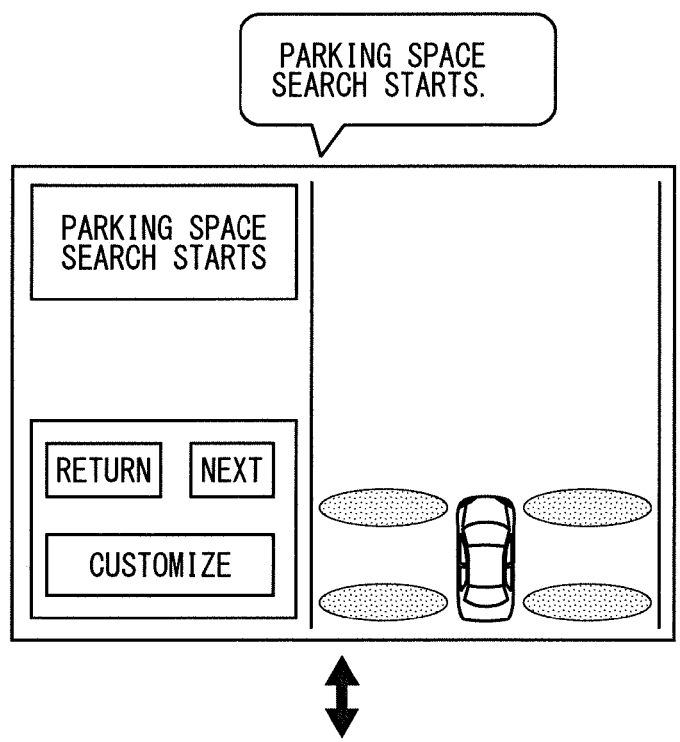
FIG. 29A
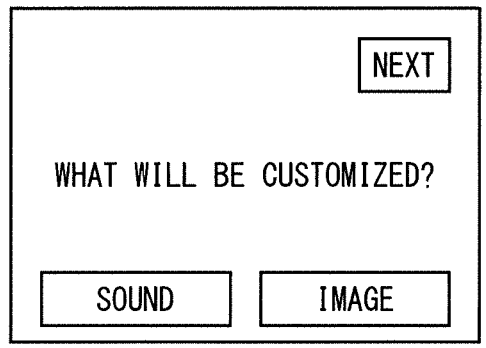
FIG. 29B
FIG. 29C
FIG. 29D

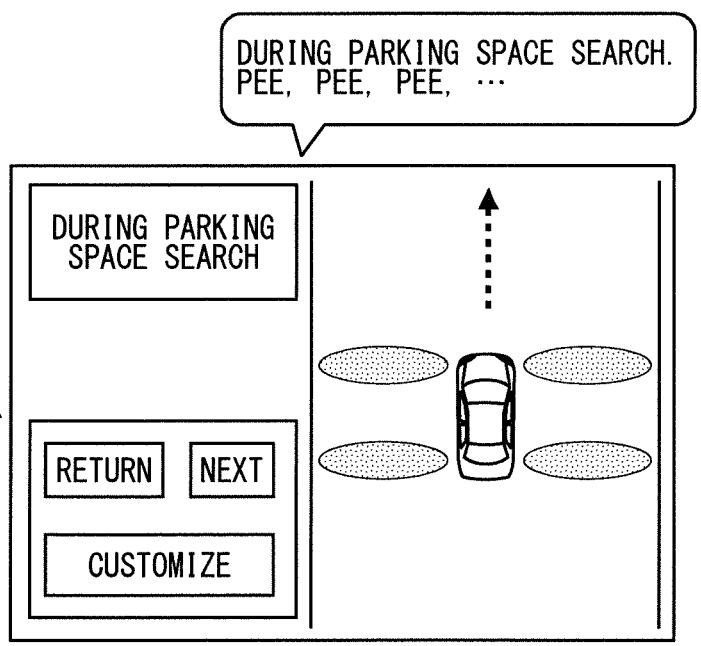
FIG. 30A
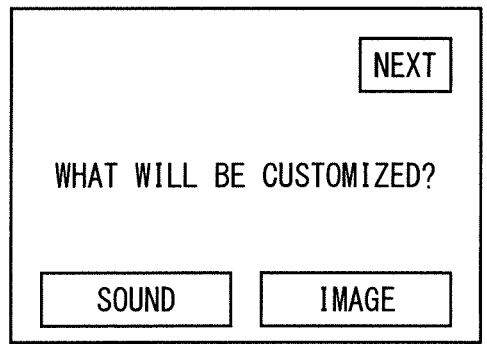
FIG. 30B
FIG. 30C
FIG. 30D

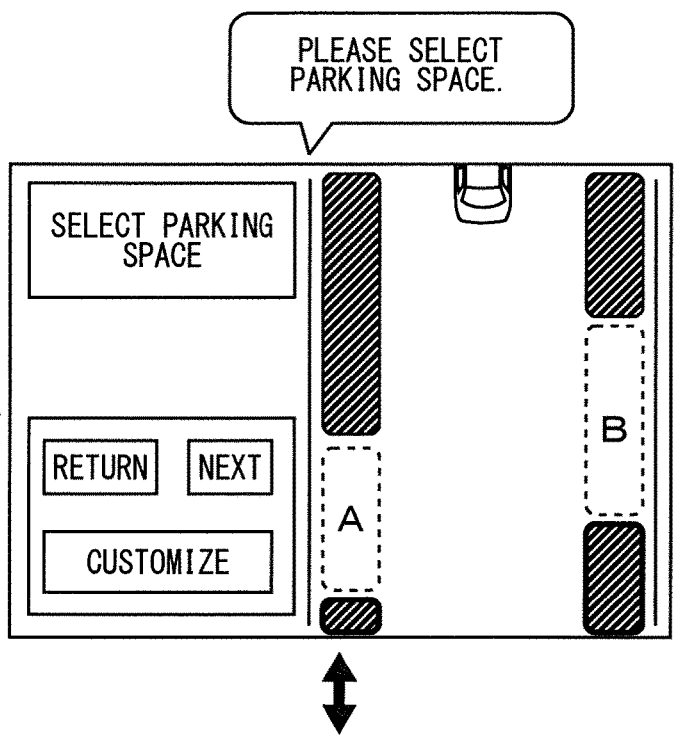
FIG. 31A
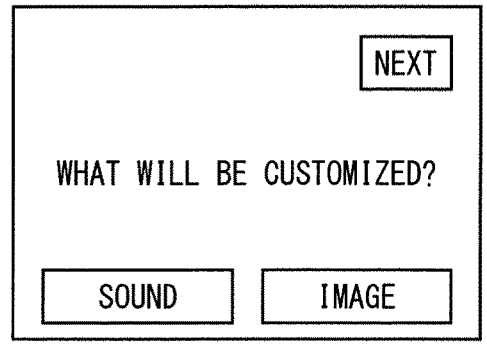
FIG. 31B
FIG. 31C
FIG. 31D

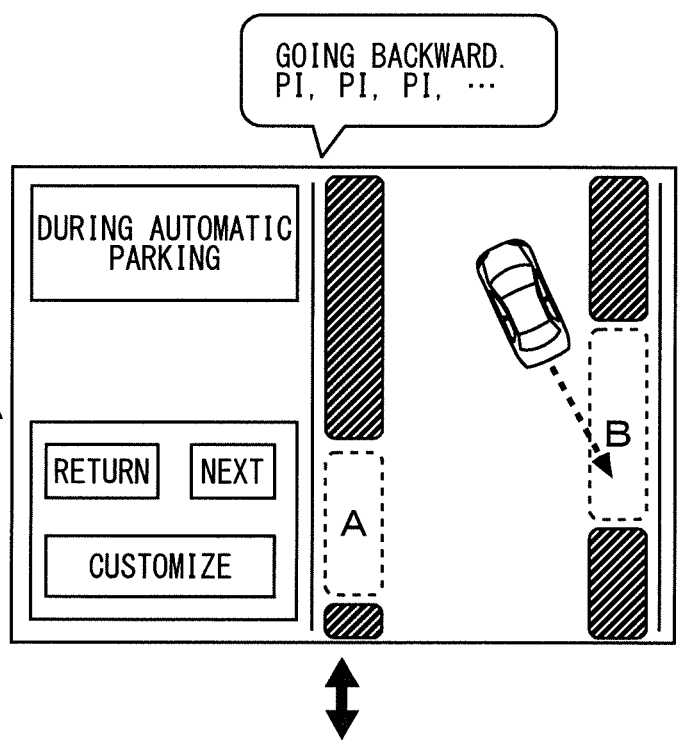
FIG. 32A
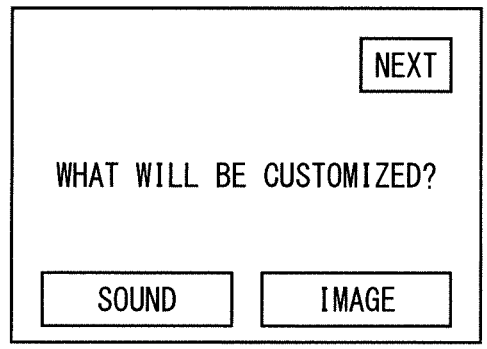
FIG. 32B
FIG. 32C
FIG. 32D

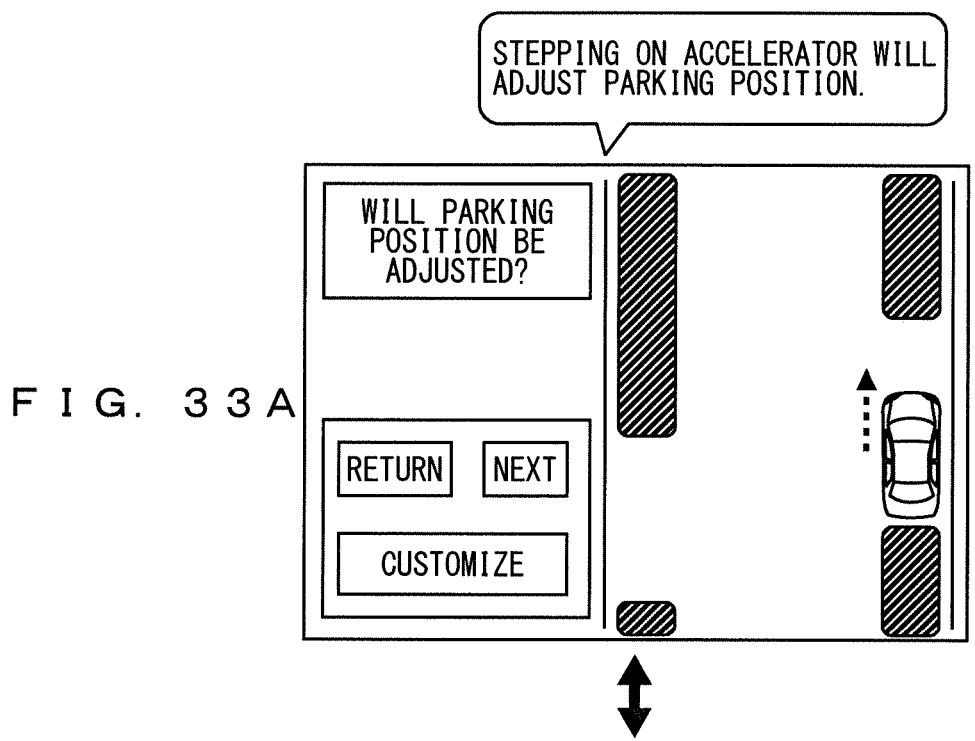
FIG. 33A
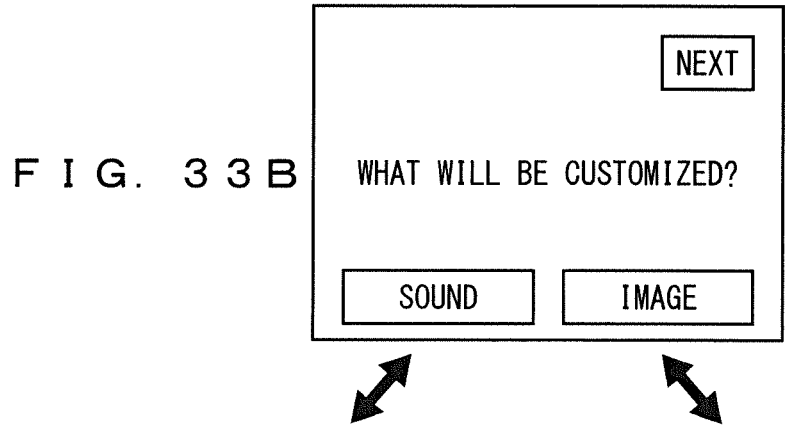
FIG. 33B
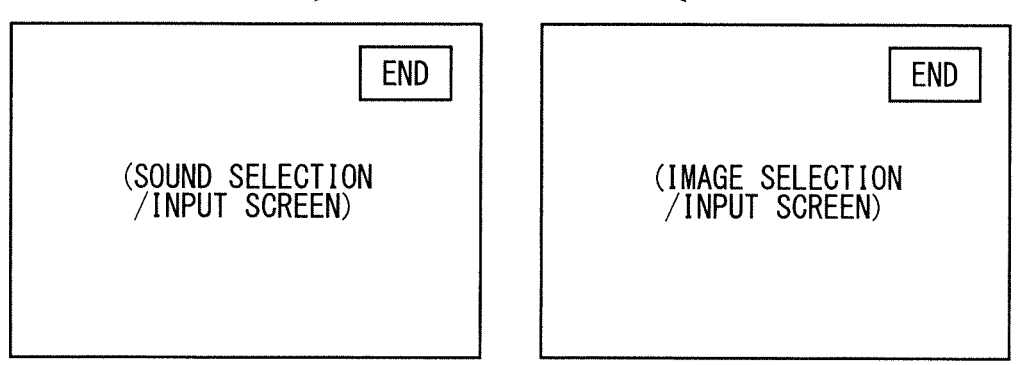
FIG. 33C
FIG. 33D

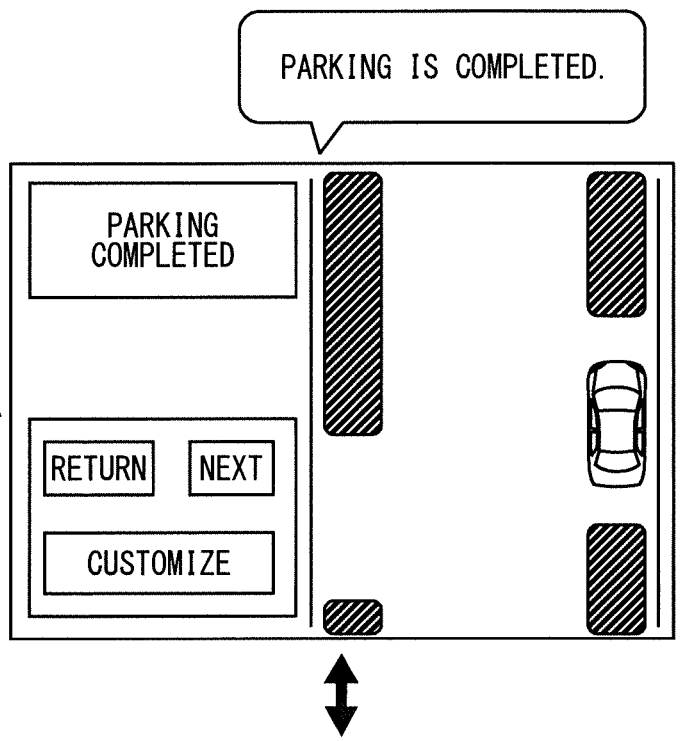
FIG. 34A
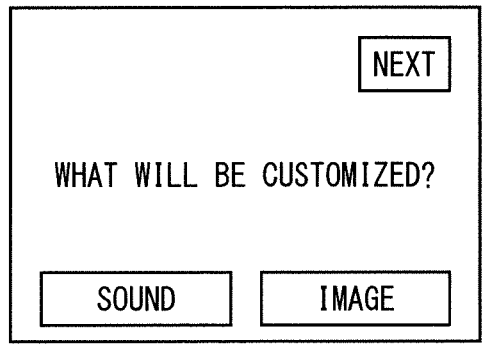
FIG. 34B
FIG. 34C
FIG. 34D

DRIVING ASSISTANCE DEVICE

TECHNICAL FIELD

The present invention relates to a driving assistance device configured to perform automatic driving of a vehicle.

BACKGROUND ART

There has been known a driving assistance device configured to perform automatic driving of a vehicle, following a predetermined driving operation pattern. The "automatic driving" referred to here is not limited to driving in which all of driving operation is automatized, but also includes driving in which only part of driving operation is automatized. For example, in Patent Document 1 below, a driving assistance device configured to perform parking by automatic driving is disclosed.

PRIOR ART DOCUMENT

Patent Document

Patent Document 1: Japanese Patent Application Laid-Open No. 2007-76496

SUMMARY OF INVENTION

Problem to be Solved by the Invention

The driving assistance device in Patent Document 1 notifies a driver of precautions, a necessary procedure of driving operation and the like when the driver performs parking by automatic driving. This enables the driver to easily carry out the parking by the automatic driving even if the driver is not accustomed to the driving assistance device. However, as the driver becomes more accustomed to the driving assistance device, the driver comes to feel that the notification from the driving assistance device is troublesome.

The present invention is achieved to solve the above-described problem, and an object of the present invention is to provide a driving assistance device that can change a detail level of notification at the time of automatic operation of a vehicle in accordance with necessity of a driver.

Means for Solving the Problems

A driving assistance device according to the present invention includes a driving operation pattern storage in which a predetermined driving operation pattern is stored, an automatic driving controller to perform automatic driving of a vehicle in accordance with the driving operation pattern, a notification sequence storage to store a notification sequence corresponding to the driving operation pattern, and a notification processor to perform notification to a driver of the vehicle in accordance with the notification sequence, in which the notification sequence storage stores a plurality of notification sequences different in detail level for one driving operation pattern, and when the automatic driving in accordance with the driving operation pattern is performed, the notification processor selects one of the plurality of notification sequences corresponding to the relevant driving operation pattern, and performs notification to the driver in accordance with the selected notification sequence in conformity with a progress of the relevant driving operation pattern in the automatic driving.

Effects of the Invention

According to the present invention, since when the automatic driving of the vehicle is performed, one of the plurality of notification sequences different in detail level is selected and used, a detail level of notification can be adjusted. Accordingly, the notification at the detail level in accordance with necessity of the driver is enabled. For example, the driver who is accustomed to the driving assistance device selects the notification sequence low in detail level, which can prevent troublesome notification from being performed.

The object, characteristics, aspects, and advantages of the present invention will be more evident through the following detailed description and accompanying drawings.

BRIEF DESCRIPTION OF DRAWINGS

FIGS. 11A to 11F are diagrams showing an example of a notification sequence with a notification content and an input request content simplified (a third notification sequence).

FIGS. 12A to 12F are diagrams showing an example of the first notification sequence in a third embodiment.

FIGS. 13A to 13F are diagrams showing an example of the second notification sequence in a third embodiment.

FIGS. 14A to 14F are diagrams showing an example of the third notification sequence in the third embodiment.

FIG. 15 is a block diagram showing a configuration of a driving assistance system according to a fifth embodiment.

FIGS. 16A to 16F are diagrams showing an example of the third notification sequence in the fifth embodiment.

FIG. 22 is a diagram showing an example of a notification sequence menu screen.

FIG. 23 is a diagram showing an example of a notification sequence change screen.

FIG. 24 is a diagram showing an example of a menu screen for a notification sequence difference description.

FIG. 25 is a diagram showing an example of a notification sequence comparison screen.

FIGS. 29A to 29D are diagrams showing an example of a screen transition during customization of the notification sequence.

FIGS. 30A to 30D are diagrams showing an example of a screen transition during customization of the notification sequence.

FIGS. 31A to 31D are diagrams showing an example of a screen transition during customization of the notification sequence.

FIGS. 32A to 32D are diagrams showing an example of a screen transition during customization of the notification sequence.

FIGS. 33A to 33D are diagrams showing an example of a screen transition during customization of the notification sequence.

FIGS. 34A to 34D are diagrams showing an example of a screen transition during customization of the notification sequence.

DESCRIPTION OF EMBODIMENTS

First Embodiment

Figure 1:
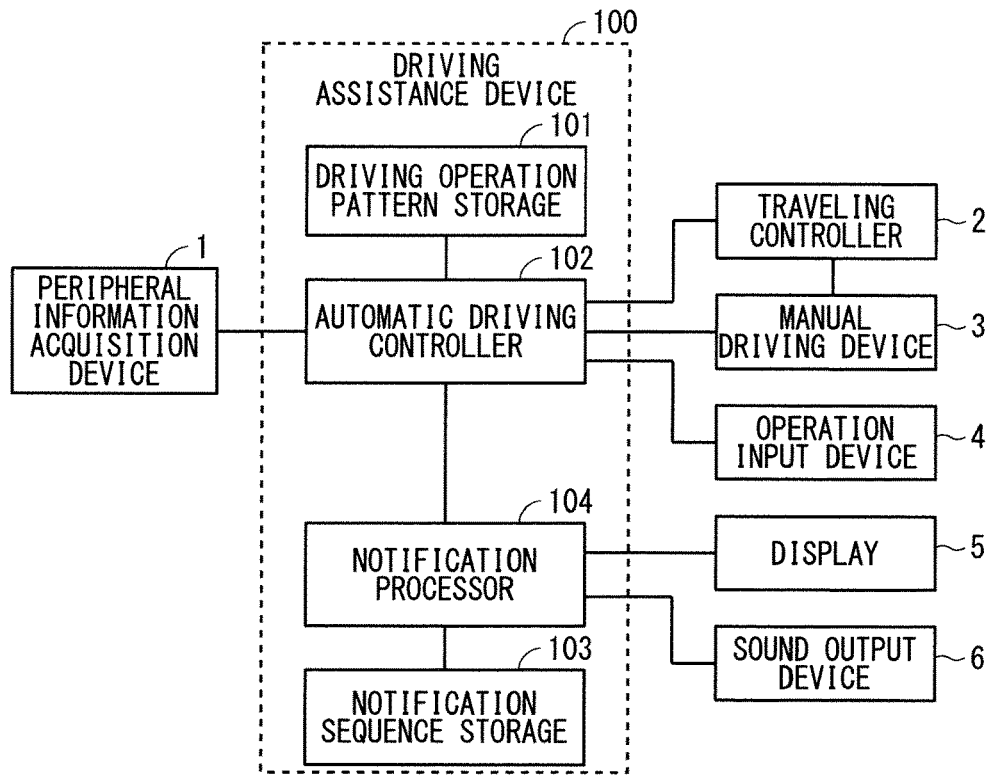
FIG. 1 is a block diagram showing a configuration of a driving assistance system according to a first embodiment.

FIG. 1 is a block diagram showing a configuration of a driving assistance system according to a first embodiment of the present invention. As in FIG. 1, the driving assistance system is configured by a driving assistance device 100 and a peripheral information acquisition device 1, a traveling controller 2, a manual driving device 3, an operation input device 4, a display 5, and a sound output device 6 which are mounted on a vehicle equipped with the driving assistance device 100 (hereinafter, referred to as "subject vehicle").

The peripheral information acquisition device 1 detects an obstacle existing in a periphery of the subject vehicle (a pedestrian, a non-subject vehicle, a feature, and the like), and acquires a relative position between the subject vehicle and the obstacle. The peripheral information acquisition device 1 is configured, for example, by an ultrasonic sensor (sonar), a camera, a millimeter-wave radar, a laser radar or the like.

The traveling controller 2 controls an engine, a motor, a gear, a steering, a brake and the like of the subject vehicle to thereby control traveling of the subject vehicle. The manual driving device 3 includes a steering wheel, a brake pedal, an accelerator pedal, a shift lever, a turn indicator lever and the like for the driver to drive the subject vehicle by the manual operation. While during normal traveling of the vehicle, the traveling controller 2 acts in accordance with the operation of the manual driving device 3 by the driver, during automatic driving, an action of the traveling controller 2 is controlled by the driving assistance device 100.

The operation input device 4 is a user interface for the driver to operate the driving assistance device 100, and may be, for example, hardware such as an operation button, a keyboard, a remote operation switch and the like, or may be a software key using a button (icon) displayed on a screen. Moreover, a part of the manual driving device 3 may be given a role of the operation input device 4.

The display 5 presents various types of information to the driver in image and in text, and for example, a liquid crystal display device (LCD), a head-up display (HUD) or the like. Moreover, the display 5 may include a simplified display device such as a light-emitting diode (LED). In the present embodiment, the display 5 is an LCD. The sound output device 6 presents various types of information to the driver by sound, and while generally, it is a speaker, simplified sound output device such as a buzzer may be included. The display 5 and the sound output device 6 functions as notification devices configured to perform the notification to the driver.

In FIG. 1, while the system configuration has been described in which the peripheral information acquisition device 1, the traveling controller 2, the manual driving device 3, the operation input device 4, the display 5, and the sound output device 6 are connected to the driving assistance device 100, part or all of these may be incorporated in the driving assistance device 100.

The driving assistance device 100, as in FIG. 1, includes a driving operation pattern storage 101, an automatic driving controller 102, a notification sequence storage 103, and a notification processor 104.

The driving operation pattern storage 101 stores driving operation patterns in each of which a procedure of driving operation regarding the automatic driving is prescribed. The automatic driving controller 102 carries out the automatic driving of the subject vehicle in accordance with an instruction from the driver or a situation of the subject vehicle. The automatic driving is performed by the automatic driving controller 102 controlling the traveling controller 2 in accordance with the driving operation patterns stored in the driving operation pattern storage 101.

The notification sequence storage 103 stores notification sequences in which a series of information that is notified to the driver during the automatic driving, notification methods for this and the like are prescribed. The notification sequences are prepared for each of the driving operation patterns stored in the driving operation pattern storage 101. In the notification sequence storage 103, for one driving operation pattern, a plurality of notification sequences different in detail level are stored. Here, the notification sequence low in detail level results from simplifying or omitting a notification content or an input request content to the driver with respect to the notification sequence high in detail level.

The notification sequence storage 103 need not store the plurality notification sequences in a complete form, and for example, only the notification sequence as a reference is stored in a complete form, and the other notification sequence may be stored as differential data with respect to the notification sequence as the reference. This can reduce a data volume of the notification sequences stored by the notification sequence storage 103.

The notification processor 104 performs various types of notifications to the driver by controlling the display 5 and the sound output device 6 during the automatic driving of the subject vehicle. The notification to the driver by the notification processor 104 is performed in conformity with progress of the relevant driving operation pattern on the basis of the notification sequence corresponding to the driving operation pattern of the automatic driving carried out. While in the present embodiment, for the one driving operation pattern, the plurality of notification sequences different in detail level are prepared, the notification processor 104 selects one of the plurality of the notification sequences to use it.

In the first embodiment, as to which of the plurality of notification sequences the notification processor 104 selects, the driver beforehand makes setting, using the operation input device 4. A specific example of a method in which the driver sets the notification sequence selected by the notification unit 104 will be described later (a tenth embodiment).

Figure 2:
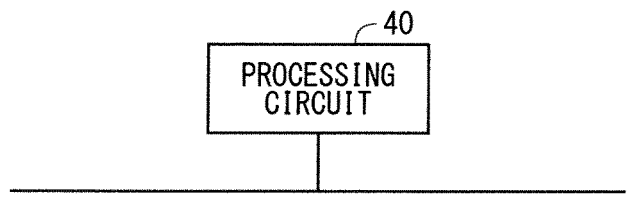
FIG. 2 is a diagram showing an example of a hardware configuration of the driving assistance device according to the present invention.
Figure 3:
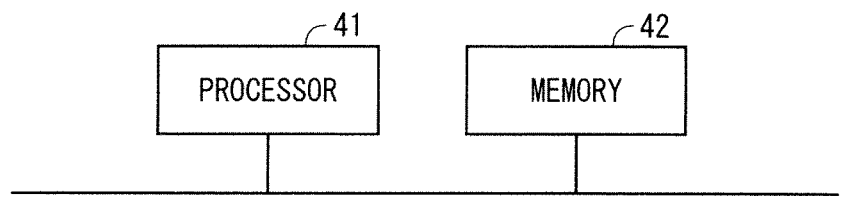
FIG. 3 is a diagram showing an example of the hardware configuration of the driving assistance device according to the present invention.

FIGS. 2 and 3 are diagrams each showing an example of a hardware configuration of the driving assistance device 100. The driving operation pattern storage 101, the automatic driving controller 102, the notification sequence storage 103, and the notification processor 104 in the driving assistance device 100 are implemented, for example, by a processing circuit 40 shown in FIG. 2. That is, the processing circuit 40 includes the driving operation pattern storage 101 configured to store the plurality of notification sequences different in detail level for the one driving operation pattern, the automatic driving controller 102 configured to perform the automatic driving of the vehicle in accordance with the relevant driving operation pattern, the notification sequence storage 103 configured to store the notification sequences corresponding to the driving operation pattern, and the notification processor 104 configured to select one of the plurality of notification sequences corresponding to the relevant driving operation pattern and perform the notification to the driver in accordance with the selected notification sequence in conformity with the progress of the relevant driving operation pattern in the automatic driving when the automatic driving in accordance with the driving operation pattern is performed. To the processing circuit 40, dedicated hardware may be applied, or a processor (a Central Processing Unit, a central processing device, a processing device, an arithmetic operation device, a microprocessor, a microcomputer, Digital Signal Processor) configured to execute a program stored in a memory may be applied.

In the case where the processing circuit 40 is the dedicated hardware, the processing circuit 40 corresponds to, for example, a single circuit, a composite circuit, a programmed processor, a parallel-programmed processor, an ASIC, an FPGA, circuits resulting from by combining these and so on. The respective functions of the driving operation pattern storage 101, the automatic driving controller 102, the notification sequence storage 103, and the notification processor 104 may be implemented by the plurality of processing circuits 40, or these functions may be collectively implemented by one processing circuit 40.

FIG. 3 shows a hardware configuration of the driving assistance device 100 in the case where the processing circuit 40 is configured, using a processor. In this case, the functions of the driving operation pattern storage 101, the automatic driving controller 102, the notification sequence storage 103, and the notification processor 104 are implemented in combination with software or the like (software, firmware, or software and firmware). The software or the like is described as a program, and is stored in a memory 42. A processor 41 as the processing circuit 40 reads out and executes the program stored in the memory 42, by which the functions of the respective units are implemented. That is, the driving assistance device 100 includes the memory 42 to store the program resulting in, during the execution by the processing circuit 40, executing a step of performing the automatic driving of the vehicle in accordance with the driving operation pattern, a step of selecting one of the plurality of notification sequences different in detail level corresponding to the relevant driving operation pattern, and a step of performing the notification to the driver in accordance with the selected notification sequence in conformity with the progress of the relevant driving operation pattern in the automatic driving. In other words, it can also be said that this program causes a computer to execute procedures and methods of the actions of the driving operation pattern storage 101, the automatic driving controller 102, the notification sequence storage 103, and the notification processor 104.

While the driving operation pattern storage 101 and the notification sequence storage 103 are configured by the memory 42, these may be configured by one memory 42, or may be configured by individual memories 42. Here, the memory 42 corresponds to, for example, a nonvolatile or volatile semiconductor memory such as a RAM (Random Access Memory), a ROM (Read Only Memory), a flash memory, an EPROM (Erasable Programmable Read Only Memory), an EEPROM (Electrically Erasable Programmable Read Only Memory) and the like, an HDD (Hard Disk Drive), a magnetic disk, a flexible disk, an optical disk, a compact disk, a minidisk, a DVD (Digital Versatile Disc), drive devices of the foregoing, and so on.

In the foregoing, the configuration has been described in which the respective functions of the driving operation pattern storage 101, the automatic driving controller 102, the notification sequence storage 103, and the notification processor 104 are implemented by any one of the hardware, the software and the like. However, the present invention is not limited thereto, but the configuration may be such that a part of the driving operation pattern storage 101, the automatic driving controller 102, the notification sequence storage 103, and the notification processor 104 can be implemented by dedicated hardware, and other parts are implemented by software and the like. For example, as to the automatic driving controller 102, the function thereof can be implemented by the processing circuit as dedicated hardware, and as for the others, the processing circuit 40 as the processor 41 reads out and executes the program stored in the memory 42 to thereby implement the functions.

As described above, the processing circuit 40 can implement the above-described functions by the hardware, the software or the like, or the combinations of these.

Figure 4:
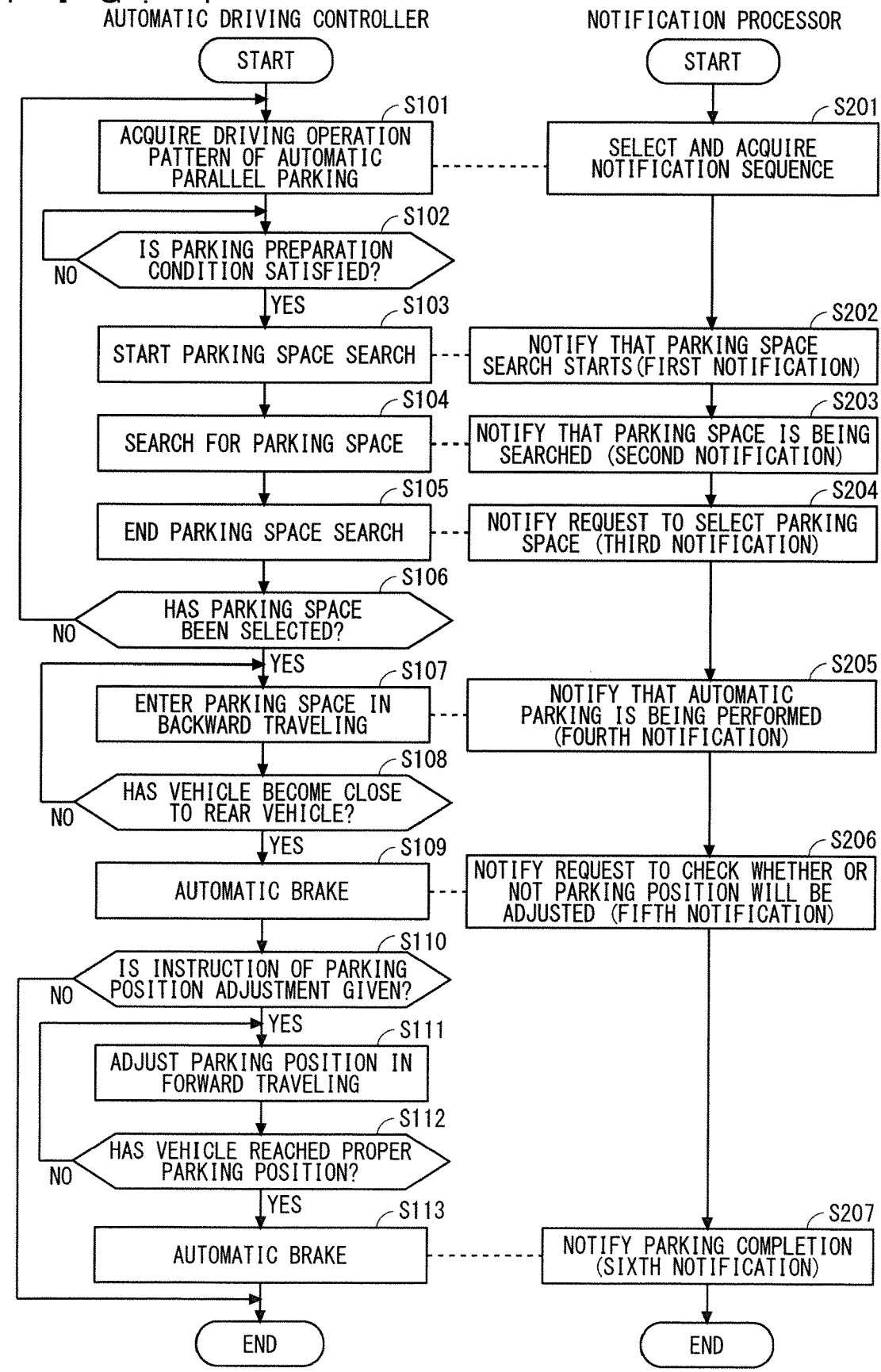
FIG. 4 is a flowchart showing an action of the driving assistance device according to the first embodiment.

An action of the driving assistance device 100 according to the first embodiment will be described, taking a specific example of the automatic driving. Here, an example in which the automatic driving of parallel parking (automatic parallel parking) is performed will be described. FIG. 4 is a flowchart showing an action of the driving assistance device 100 when the automatic parallel parking is performed, in which actions of the automatic driving controller 102 and the notification processor 104 are shown.

Figure 5:
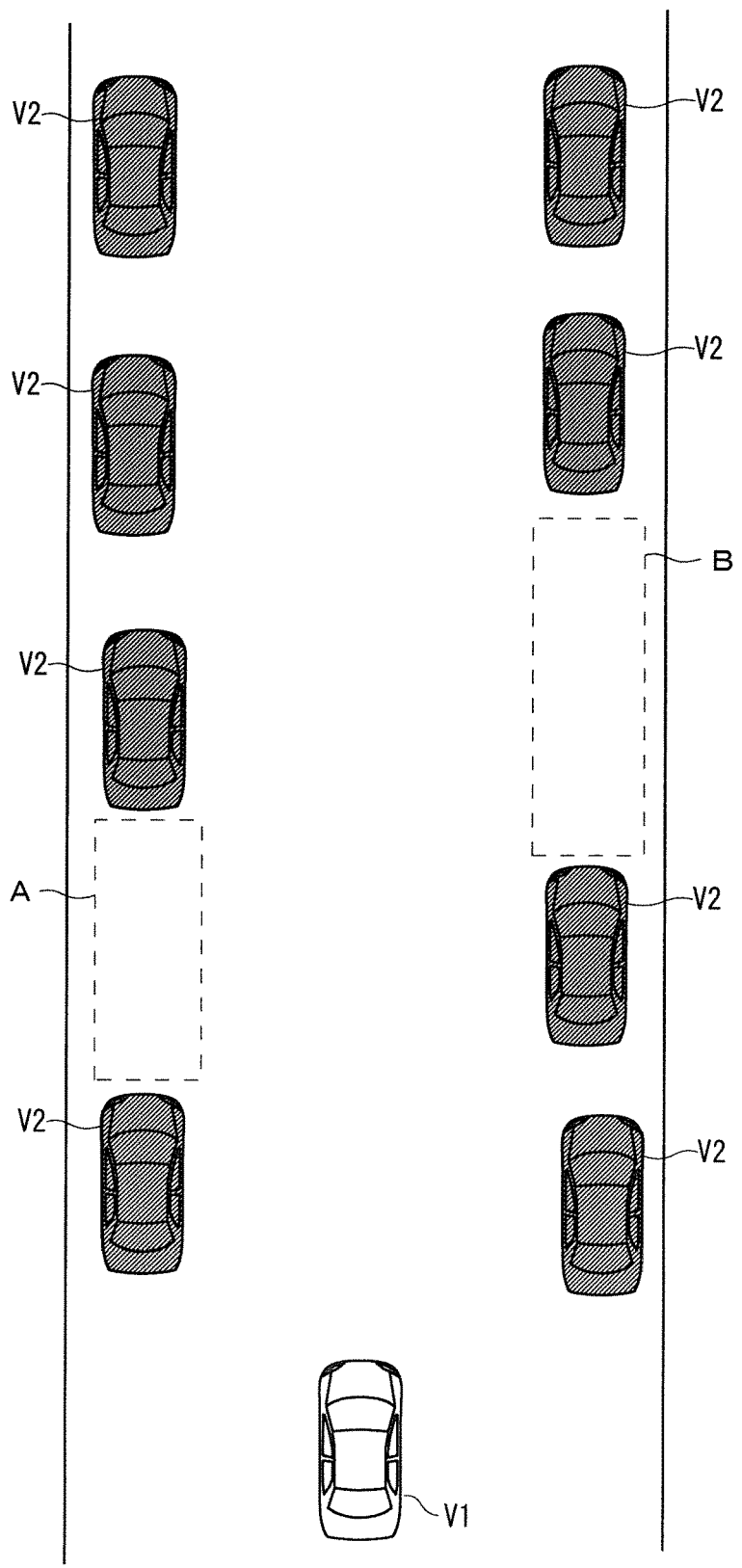
FIG. 5 is a diagram for describing a driving operation pattern of parallel parking.
Figure 6:
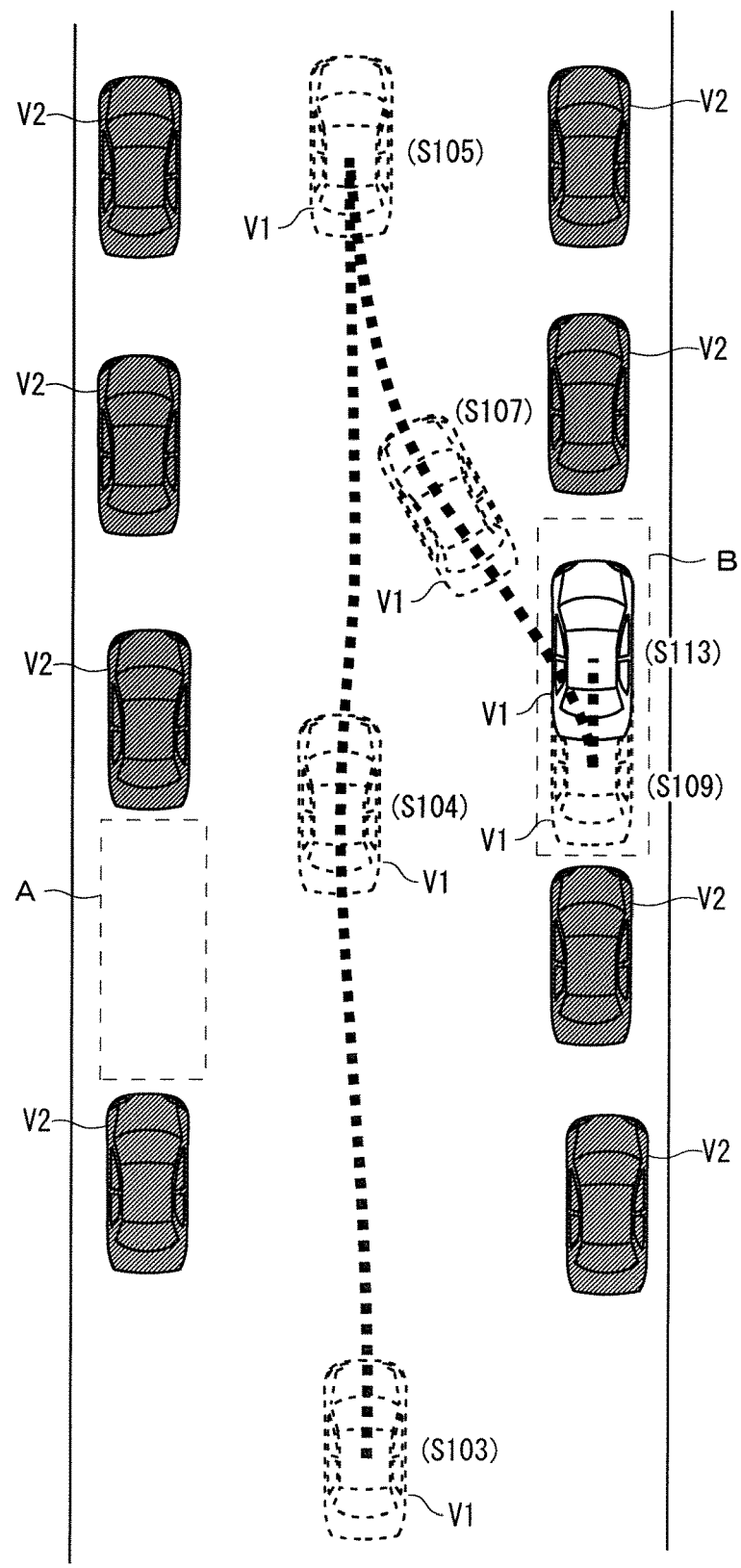
FIG. 6 is a diagram for describing the driving operation pattern of parallel parking.
Figure 7:
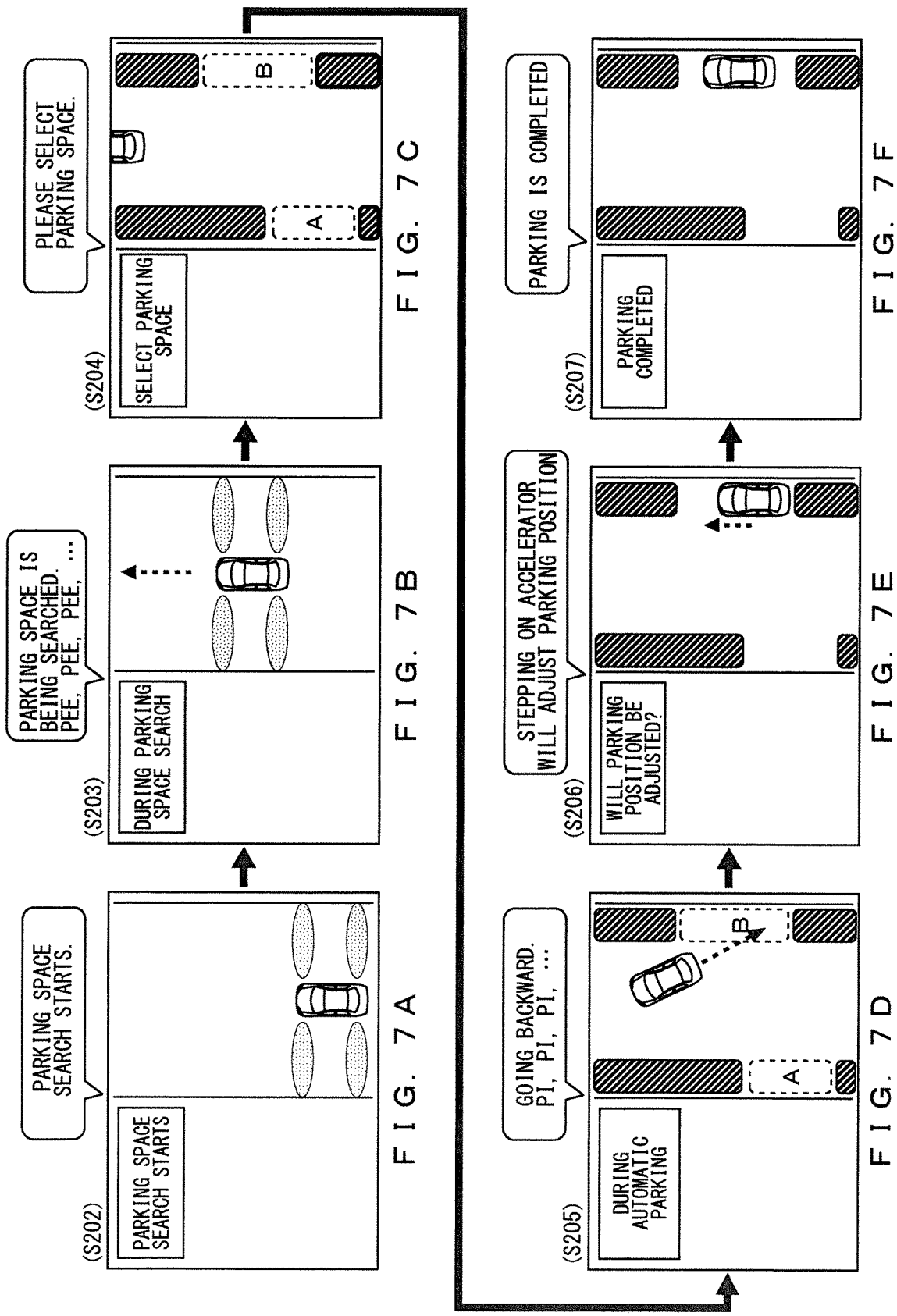
FIGS. 7A to 7F are diagrams showing an example of a notification sequence high in detail level (a first notification sequence).
Figure 8:
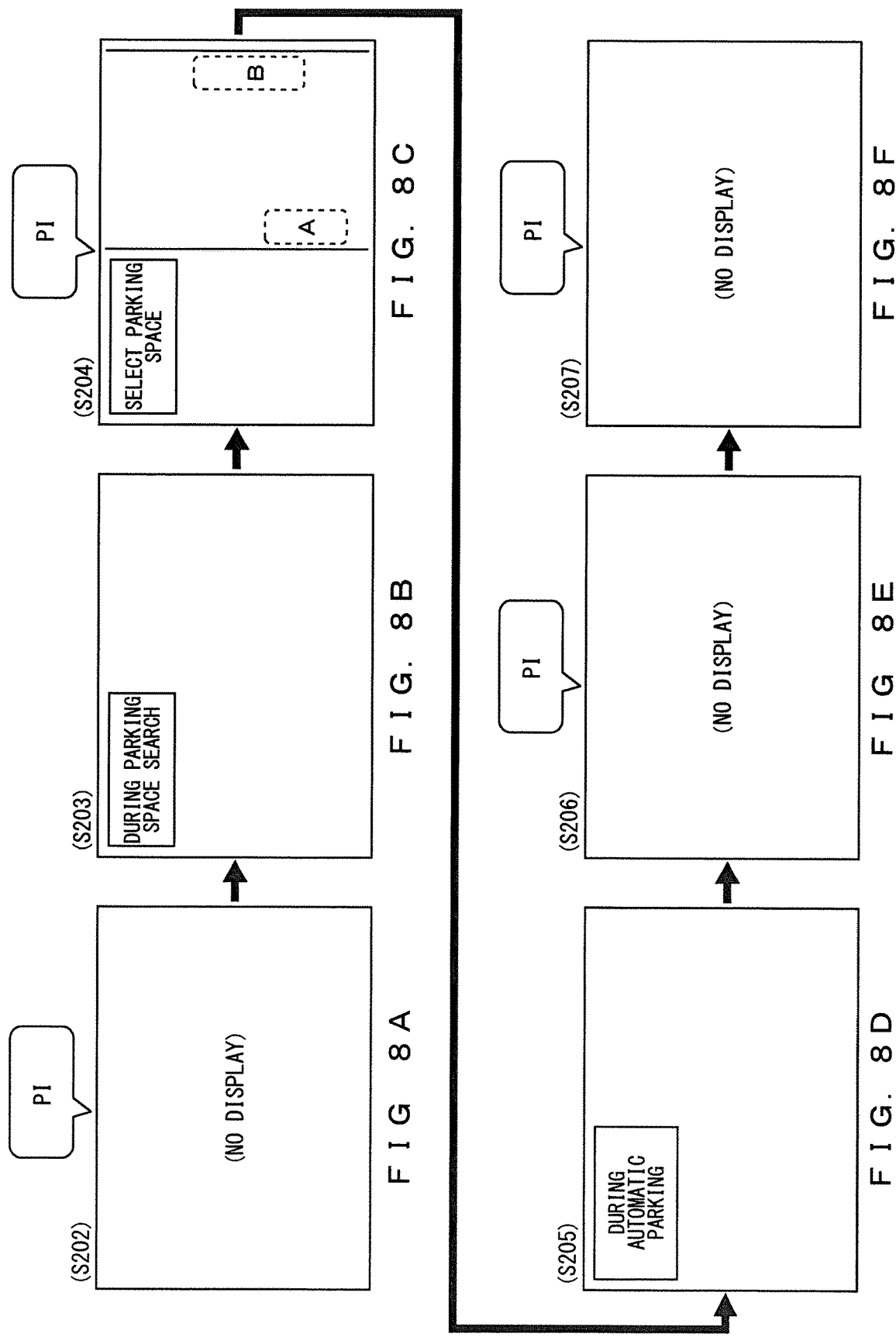
FIGS. 8A to 8F are diagrams showing an example of a notification sequence with a notification content simplified (a second notification sequence).

FIGS. 5 and 6 are diagrams for describing the driving operation pattern in the automatic parallel parking. Here, as in FIG. 5, it is supposed that many non-subject vehicles V2 are parked on both sides of a road on which the subject vehicle V1 is traveling, and that the subject vehicle V1 will be parked in a parking space A or B between the non-subject vehicles V2. Reference signs in parentheses in FIG. 6 correspond to respective steps of the action of the automatic driving controller 102 in FIG. 4.

FIGS. 7A to 7F and 8A to 8F are diagrams showing an example of the notification sequences corresponding to the driving operation pattern of the automatic parallel parking. Reference signs in parentheses in FIGS. 7A to 7F and 8A to 8F correspond to respective steps of the action of the notification processor 104 in FIG. 4. In the notification sequence storage 103, the notification sequence high in detail level as in FIGS. 7A to 7F (hereinafter, referred to as a "first notification sequence"), and the notification sequence with a notification content simplified as in FIGS. 8A to 8F (hereinafter, referred to as a "second notification sequence") for the driving operation pattern of the automatic parallel parking are stored.

When in accordance with an instruction of the driver or a situation of the subject vehicle V1, the driving assistance device 100 enters an action mode in which the automatic parallel parking is performed, the automatic driving controller 102 acquires the driving operation pattern of the automatic parallel parking from the driving operation pattern storage 101 (step S101). The action hereinafter performed by the automatic driving controller 102 (steps S102 to S113) are based on the driving operation pattern acquired in step S101.

When the automatic driving controller 102 acquires the driving operation pattern of the automatic parallel parking, the notification processor 104 acquires the notification sequences corresponding to the driving operation pattern of the automatic parallel parking from the notification sequence storage 103 (step S201). In the notification sequence storage 103, the detailed first notification sequence (FIGS. 7A to 7F) and the simplified second notification sequence (FIGS. 8A to 8F) are stored as the notification sequences corresponding to the automatic parallel parking. The notification processor 104 selects one of them, and here, it is assumed that setting is beforehand made by the driver so as to select the first notification sequence.

Subsequently, the automatic driving controller 102 waits for a "parking preparation condition" to be satisfied, which is a condition for the subject vehicle V1 to start preparation of the automatic parallel parking (step S102). The parking preparation condition is, for example, "a speed of the subject vehicle V1 is 10 km/h or lower", or the like.

If the parking preparation condition is satisfied (YES in step S102), the automatic driving controller 102 starts search for the parking space using the peripheral information acquisition device 1 (step S103). At this time, the notification processor 104 performs notification to the effect that the search for the parking space starts (first notification) to the driver in accordance with the first notification sequence (step S202). For example, as in FIG. 7A, an image of the vehicle searching for the parking space, and a text "Parking space search starts" are displayed on the display 5, and a voice "Parking space search will start" is outputted from the sound output device 6.

Thereafter, when the driver steps on the accelerator pedal, the automatic driving controller 102 searches for the parking space while advancing the subject vehicle V1 as in FIG. 6 (step S104). At this time, steering wheel operation may be automatically performed. While the search for the parking space is being performed, the notification processor 104 performs notification to the effect that the parking space is being searched for (second notification) to the driver in accordance with the first notification sequence (step S203). For example, as in FIG. 7B, an image of the vehicle advancing while searching for a parking space and a text "During search for parking space" are displayed on the display 5, and a voice "During search for parking space" and effect sound "pee, pee, pee, . . . " are outputted from the sound output device 6.

When the driver steps on the brake pedal to stop the subject vehicle V1, the automatic driving controller 102 ends the search for the parking space (step S105). At this time, the notification processor 104 performs notification to request selection of a parking space (a third notification) to the driver in accordance with the first notification sequence (step S204). For example, as in FIG. 7C, an image showing detected parking spaces and an obstacle around these, and a text "Select a parking space" are displayed on the display 5, and a voice "Please select the parking space" is outputted from the sound output device 6. The automatic driving controller 102 waits for the driver to select a parking space (step S106).

While a method in which the driver selects the parking space may be an arbitrary method, in the present embodiment, the driver selects the parking space by operation of the turn indicator lever. For example, as in FIG. 6, it is supposed that at a time point when the search for the parking space ends (step S105), there exist the parking space A to left rear of the subject vehicle V1, and the parking space B to right rear. When wanting to select the parking space A, the driver of the subject vehicle V1 operates the turn indicator lever so as to light a left turn indicator, and when wanting to select the space B, the driver operates the turn indicator lever so as to light a right turn indicator.

When the driver selects the parking space (YES in step S106), the automatic driving controller 102 causes the subject vehicle V1 to enter the selected parking space in backward traveling (step S107). At this time, accelerator operation is performed by the driver, and steering wheel operation is automatically performed. Meanwhile, the notification processor 104 performs notification to the effect that an automatic parking is being performed (a fourth notification) to the driver in accordance with the first notification sequence (step S205). For example, as in FIG. 7D, an image of the vehicle entering the parking space, and a text "During automatic parking" are displayed on the display 5, and a voice "Going backward", and effect sound "pi, pi, pi, . . . " are outputted from the sound output device 6.

At this time, the automatic driving controller 102 checks whether or not the subject vehicle V1 becomes close to a rear vehicle (the non-subject vehicle V2 parking on a rear side of the parking space) (step S108). That is, a distance from the subject vehicle V1 to the rear vehicle is measured, using the peripheral information acquisition device 1 to check whether or not the distance becomes a predetermined threshold value or lower.

If the subject vehicle V1 enters the parking space, and becomes close to the rear vehicle (YES in step S108), the automatic driving controller 102 stops the subject vehicle V1 by an automatic brake (step S109). At this time, the notification processor 104 performs notification to request a check as to whether or not a parking position will be subsequently adjusted (a fifth notification) to the driver in accordance with the first notification sequence (step S206). For example, as in FIG. 7E, an image of the vehicle located closer to a rear portion inside the parking space, and a text "will the parking position be adjusted?" are displayed on the display 5, and a voice "Stepping on the accelerator will adjust the parking position" is outputted from the sound output device 6.

The driver can instruct the adjustment of the parking position to the automatic driving controller 102 by stepping on the accelerator pedal. When the driver steps on the accelerator pedal to input an instruction of parking position adjustment to the automatic driving controller 102 (YES in step S110), the automatic driving controller 102 causes the subject vehicle V1 to travel forward and adjusts the parking position (step S111). If the driver does not step on the accelerator pedal (NO in step S110), the processing of the automatic parallel parking ends.

When the adjustment of the parking position is performed, the automatic driving controller 102 checks positional relations between the subject vehicle V1, and the rear vehicle and a front vehicle (the non-subject vehicle V2 parking in front of the parking space) to check whether or not the subject vehicle V1 has reached a proper parking position (step S112). This determination is made by determining whether or not enough distance between the subject vehicle V1 and the front vehicle for the subject vehicle V1 to smoothly go out of the parking space (without turn-back operation) can be secured, whether or not enough distance between the subject vehicle V1 and the rear vehicle to smoothly go out of the parking space can be secured, and so on.

Thereafter, if the subject vehicle V1 has reached the proper parking position (YES in step S112), the automatic driving controller 102 stops the subject vehicle V1 by the automatic brake (step S113). At this time, the notification processor 104 performs notification of parking completion (a sixth notification) to the driver in accordance with the first notification sequence (step S207). For example, as in FIG. 7F, an image of the vehicle stopping inside the parking space, and a text "Parking completed" are displayed on the display 5, and a voice "Parking is completed" is outputted from the sound output device 6. With the foregoing, the processing of the automatic parallel parking by the driving assistance device 100 has been completed.

Next, in step S201 in the flow of FIG. 4, an action of the driving assistance device 100 when setting is beforehand made by the driver so as to select the second notification sequence low in detail level (FIGS. 8A to 8F) will be described. In this case, while the action of the notification processor 104 is changed to an action based on the second notification sequence, basically, the action of the automatic driving controller 102 is not changed. Thus, the action of the automatic driving controller 102 will be briefly described.

When the driving assistance device 100 enters the action mode in which the automatic parallel parking is performed, and the automatic driving controller 102 acquires the driving operation pattern of the automatic parallel parking (step S101), the notification processor 104 acquires the second notification sequence from the notification sequence storage 103.

Thereafter, when the parking preparation condition is satisfied (YES in step S102), the automatic driving controller 102 starts the search for the parking space (step S103), the notification processor 104 performs the notification to the effect that the search for the parking space starts (the first notification) to the driver in accordance with the second notification sequence (step S202). For example, as in FIG. 8A, nothing is displayed on the display 5, and only effect sound "pi" is outputted from the sound output device 6.

Thereafter, while the search for the parking space by the automatic driving controller 102 is being performed, the notification processor 104 performs the notification to the effect that the parking space is being searched for (the second notification) to the driver in accordance with the second notification sequence (step S203). For example, as in FIG. 8B, only the text "During search for parking space" is displayed on the display 5, and nothing is outputted from the sound output device 6.

When the search for the parking space by the automatic driving controller 102 ends (step S105), the notification processor 104 performs the notification to request the selection of the parking space (the third notification) to the driver in accordance with the second notification sequence (step S204). For example, as in FIG. 8C, the image showing the detected parking spaces and the text "Select a parking space" are displayed on the display 5, and the effect sound "pi" is outputted from the sound output device 6.

Thereafter, if the driver selects the parking space (YES in step S106), the automatic driving controller 102 causes the subject vehicle V1 to enter the selected parking space in backward traveling (step S107). Meanwhile, the notification processor 104 performs the notification to the effect that the automatic parking is being performed (the fourth notification) to the driver in accordance with the second notification sequence (step S205). For example, as in FIG. 8D, only the text "During automatic parking" is displayed on the display 5, and nothing is outputted from the sound output device 6.

If the subject vehicle V1 becomes close to the rear vehicle (YES in step S108), and the automatic driving controller 102 stops the subject vehicle V1 (step S109), the notification processor 104 performs the notification to request the check as to whether or not the parking position will be subsequently adjusted (the fifth notification) to the driver in accordance with the second notification sequence (step S206). For example, as in FIG. 8E, nothing is displayed on the display 5, and the effect sound "pi" is outputted from the sound output device 6.

The driver can instruct the adjustment of the parking position to the automatic driving controller 102 by stepping on the accelerator pedal. If the instruction of the parking position adjustment is issued (YES in step S110), the automatic driving controller 102 causes the subject vehicle V1 to travel forward and adjust the parking position (step S111), while if the instruction of the parking position adjustment is not issued (NO in step S110), the processing of the automatic parallel parking ends.

In the case where the parking position adjustment is performed, if the subject vehicle V1 has reached the proper parking position (YES in step S112), the automatic driving controller 102 stops the subject vehicle V1 by the automatic brake (step S113). At this time, the notification processor 104 performs the notification of the parking completion (the sixth notification) to the driver in accordance with the second notification sequence (step S207), For example, as in FIG. 8F, nothing is displayed on the display 5, and the effect sound "pi" is outputted from the sound output device 6. With the foregoing, the processing of the automatic parallel parking by the driving assistance device 100 is completed.

In this manner, the driving assistance system in the first embodiment, when the automatic driving of the subject vehicle is performed, one of the plurality of notification sequences different in detail level can be selected and used, by which the detail level of the notification can be adjusted. Accordingly, the notification in accordance with necessity of the driver is enabled. For example, the driver who is not accustomed to the use of the driving assistance device 100 can receive the more detailed notification by selecting the first notification sequence, and easily carry out the automatic driving. Moreover, the driver who is accustomed to the driving assistance device 100 can receive the simplified notification by selecting the second notification sequence, which can prevent the driver from feeling troublesome.

Figure 9:
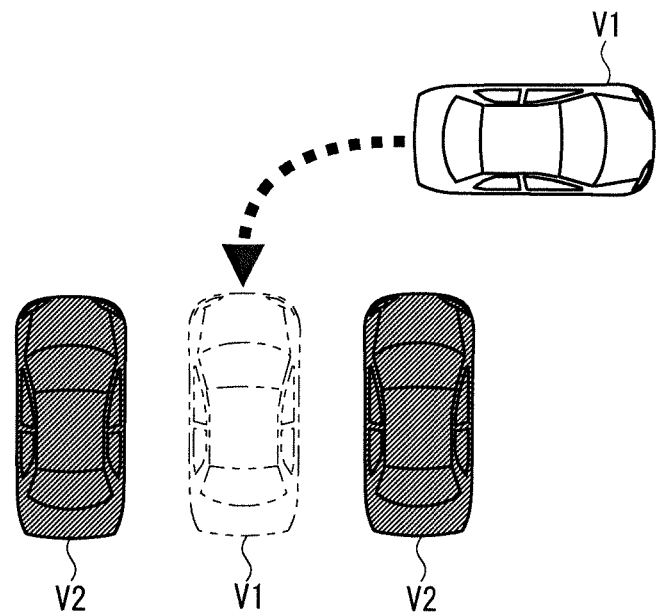
FIG. 9 is a diagram for describing a modification of the first embodiment.
Figure 10:
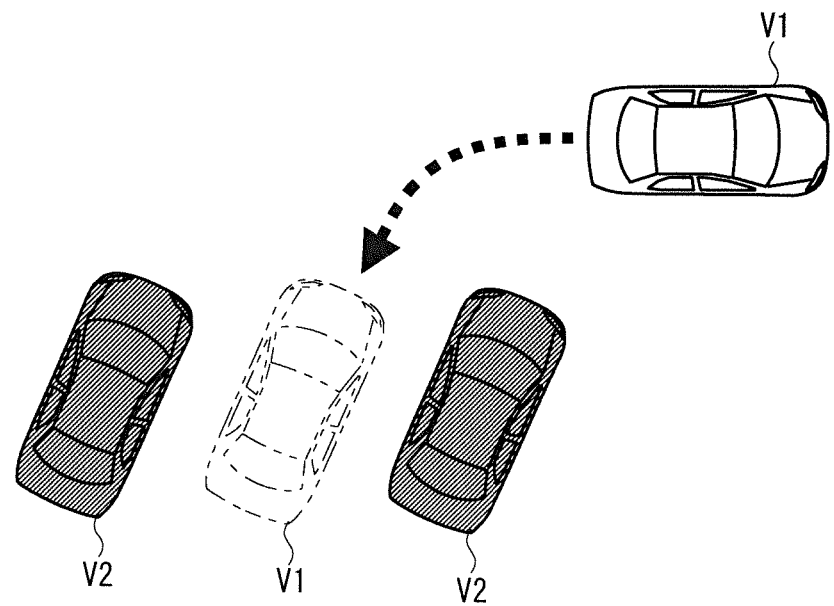
FIG. 10 is a diagram for describing a modification of the first embodiment.

While in the first embodiment, the example in which the driving operation pattern of the parallel parking is stored in the driving operation pattern storage 101 has been described, the present invention can also be applied to another driving operation pattern. For example, the present invention can also be applied to a driving operation pattern of double parking in which the subject vehicle V1 is parked between the non-subject vehicles V2 arranged transversely as in FIG. 9, and a driving operation pattern of diagonal parking in which the subject vehicle V1 is parked between the non-subject vehicles V2 arranged diagonally as in FIG. 10. Moreover, the plurality of driving operation patterns such as the foregoing may be stored in the driving operation pattern storage 101. In this case, in the notification sequence storage 103, a plurality of notification sequences different in detail level are stored for each of the plurality of driving operation patterns.

Second Embodiment

While in the first embodiment, the example has been described in which the two types of notification sequences of the first notification sequence and the second notification sequence are prepared for the one driving operation pattern, more notification sequences may be prepared. Moreover, while in the first embodiment, the action of the automatic driving controller 102 does not change between when the first notification sequence is selected and when the second notification sequence is selected, the automatic driving controller 102 may change a content of the automatic driving or a control parameter of the automatic driving in accordance with the selected notification sequence.

In the second embodiment, in addition to the first and second notification sequences described in the first embodiment, a third notification sequence in which the input request content is simplified more than that of the second notification sequence is stored in the notification sequence storage 103. The notification processor 104 selects one of these three notification sequences. Moreover, when the third notification sequence is selected by the notification processor 104, the automatic driving controller 102 changes the content of the automatic driving from that when the first or the second notification sequence is selected.

FIGS. 11A to 11F are diagrams showing an example of the third notification sequence. An action of the driving assistance device 100 when the third notification sequence is selected is almost the same as the action when the second notification sequence is selected, and thus, differences between both will be described.

When the third notification sequence is selected by the notification processor 104, the automatic driving controller 102 changes the content of the automatic driving, and when the search for the parking space ends (step S105 in FIG. 4), the automatic driving controller 102 does not request the selection of the parking space to the driver, and automatically selects the parking space located on the right side of the subject vehicle V1 (i.e., the parking space B). At this time, the notification processor 104 performs the third notification performed in step S204 in accordance with the third notification sequence. The third notification in the third notification sequence is notification to the effect that the parking space will be automatically selected. For example, as in FIG. 11C, the image showing the detected parking spaces and the text "Parking in parking space B" are displayed on the display 5, and the effect sound "pi" is outputted from the sound output device 6.

When the third notification sequence is selected, the driver can also select the parking space, using the turn indicator lever, and in this case, the selection by the driver is given priority. That is, if the driver does not perform the selection operation of the parking space, the subject vehicle V1 is automatically parked in the parking space B on the right side, while if the driver selects the parking space A on the left side of the subject vehicle V1 with the turn indicator lever, the subject vehicle V1 is automatically parked in the parking space A. Accordingly, if the driver accepts the selection of the parking space B, time and trouble for selecting the parking space can be saved.

In this manner, the automatic driving controller 102 in the second embodiment is configured such that when the third notification sequence is selected, the selection of the parking space is automatically performed. That is, the automatic driving controller 102 of the second embodiment automatically performs more of a plurality of driving operations configuring the driving operation pattern as the detail level of the selected notification sequence becomes lower (a ratio of the operations to be automatically performed is increased). While the driver who is not accustomed to the driving assistance device 100 may feel uneasy about the situation that many of the driving operations are automatically performed, when the driver who becomes accustomed to the driving assistance device 100 and highly trusts the driving assistance device 100 will not feel uneasy. Thus, the third notification sequence is highly convenient for the driver who highly trusts the driving assistance device 100.

Third Embodiment

In a third embodiment, an example will be described in which the automatic driving controller 102 changes a control parameter of the automatic driving in accordance with the notification sequence selected by the notification processor 104.

Generally, when automatic steering (automatic steering operation) is performed in the automatic driving, a steering wheel of a driver seat is automatically turned. The driver who is not accustomed to the driving assistance device 100 often feels uneasy about the situation where the steering wheel automatically turns at a high speed. Consequently, in the third embodiment, when the notification sequence high in detail level is selected, it is determined that the driver is not accustomed to the driving assistance device 100, and an automatic steering speed is lowered to suppress a turning speed of the steering wheel. This prevents the driver who is not accustomed to the driving assistance device 100 from feeling uneasy about the turning of the steering wheel. Moreover, when the notification sequence low in detail is selected, it is determined that the driver is accustomed to the driving assistance device 100, and the automatic steering speed is made higher than that when the notification sequence high in detail level is selected, so that time required for the automatic parking is shorten.

When the automatic steering speed (the turning speed of the steering wheel) is changed in accordance with the selected notification sequence, the notification content in each of the notification sequences may include the turning speed of the steering wheel. FIGS. 12A to 12F show an example in which display of the turning speed of the steering wheel is included in the first notification sequence, FIGS. 13A to 13F show an example in which the display of the turning speed of the steering wheel is included in the second notification sequence, and FIGS. 14A to 14F show an example in which the display of the turning speed of the steering wheel is included in the third notification sequence. In each of FIGS. 12D, 13D, 14D, the display of the turning speed (any of "low", "intermedium", and "high") is included. The others are the same of those in the first, second, and third notification sequences shown in FIGS. 7A to 7F, 8A to 8F, and 11A to 11F, and thus, descriptions will be omitted.

Fourth Embodiment

During performing the automatic driving, the automatic driving controller 102 of the driving assistance device 100 monitors the distance between the subject vehicle and a peripheral obstacle, using the peripheral information acquisition device 1 to control the action of the subject vehicle so that the subject vehicle does not come into contact with the obstacle. However, the driver who is not accustomed to the driving assistance device 100 often feels uneasy when the distance between the subject vehicle and the obstacle becomes short during the automatic driving.

Consequently, in a fourth embodiment, when the notification sequence high in detail level is selected, it is determined that the driver is not accustomed to the driving assistance device 100, an allowable value of the distance from the subject vehicle to the obstacle is increased so as to constantly secure a long distance between the subject vehicle and the obstacle. This prevents the driver who is not accustomed to the driving assistance device 100 from feeling uneasy as to whether or not the subject vehicle will come into contact with the obstacle.

Moreover, when the notification sequence low in detail level is selected, it is determined that the driver is accustomed to the driving assistance device 100, and the allowable value of the distance to the obstacle is made smaller than that when the notification sequence high in detail level is selected. This allows the subject vehicle to be led to a more preferable position. As a result, for example, when the automatic parking in a narrow space is performed, a number of times of "turn-back" can be made small.

Fifth Embodiment

While in the above-described embodiments, the examples have been described in which the notification using the same display (LCD) is performed regardless of the notification sequence selected by the notification processor 104, the display may be changed in accordance with the selected notification sequence.

FIG. 15 is a block diagram showing a configuration of a driving assistance system according to a fifth embodiment. This driving assistance system is configured such that the display 5 in FIG. 1 is replaced by two of a first display 51 and a second display 52. Here, the first display 51 is a liquid crystal display (LCD), and the second display 52 is a head-up display (HUD). The HUD displays an image on a windshield of the subject vehicle, by which the relevant image is displayed as a virtual image in the driver's visual field. To the driver, it seems as if the virtual image exists in a front space of the subject vehicle.

In the fifth embodiment, the notification processor 104 of the driving assistance device 100 uses the first display 51 (LCD) when performing the notification in accordance with the first notification sequence or the second notification sequence, and uses the second display 52 (HUD) when performing the notification in accordance with the third notification sequence. The first notification sequence and the second notification sequence displayed, using the first display 51 are the same as those in FIGS. 7A to 7F and 8A to 8F, respectively, and thus, descriptions will be omitted.

FIGS. 16A to 16F show an example of the third notification sequence displayed, using the second display 52. FIGS. 16A to 16F correspond to FIGS. 11A to 11F showing the third notification sequence, respectively. While a content of the third notification sequence in FIGS. 16A to 16F is almost the same as that in FIGS. 11A to 11F, it is largely different in that a display area is on the windshield of the subject vehicle. For example, the text "During search for parking space" in FIG. 16B, a text "Parking in space B" and figures of right and left arrows in FIG. 16C, and the text "During automatic parking" in FIG. 16D are images (virtual images) displayed by the second display 52 (the vehicles shown in FIGS. 16A to 16F are not images but scenes that can be seen through the windshield).

Since the HUD directly displays the image in the visual field of the driver, the driver can visually check the image with less movements of a visual line. However, it is preferably, the image displayed, using the HUD is low in detail level and simple, lest it should disturb the driving. Thus, in the present embodiment, a configuration is employed in which when the notification in accordance with the notification sequence high in detail level is performed, using the first display 51 secures the visual field of the driver, and only when the notification in accordance with the notification sequence low in detail level is performed, the second display 52 is used for the notification.

While in the present embodiment, the configuration is employed in which the two displays are used separately in accordance with the notification sequence, more displays may be used separately. Moreover, a plurality of sound output devices may be used separately in accordance with the notification sequence. For example, it can be considered that a speaker is used in the notification sequence in which the notification including a voice message, and that a buzzer is used in the notification sequence in which the notification by sound is only simple effect sound.

Sixth Embodiment

In each of the above-described embodiments, it is premised that the notification sequence selected by the notification processor 104 is set in accordance with preference of the driver. In a sixth embodiment, the driving assistance device 100 determines a familiarity degree of the driver to the driving assistance device 100 (hereinafter, may be simply referred to as a "familiarity degree"), and automatically selects the notification sequence in accordance with a determination result. That is, when it is determined that the familiarity degree of the driver to the driving assistance device 100 is high, the notification sequence low in detail level is automatically selected.

Figure 17:
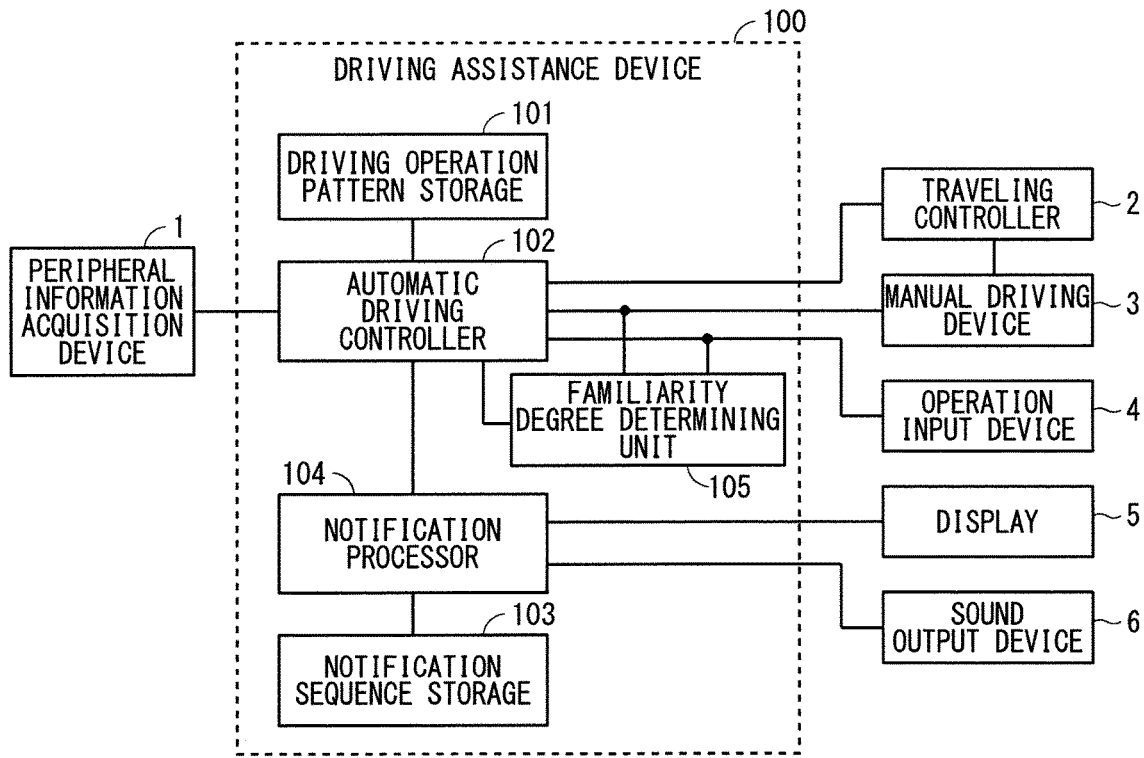
FIG. 17 is a block diagram showing a configuration of a driving assistance system according to a sixth embodiment.

FIG. 17 is a block diagram showing a configuration of a driving assistance system according to the sixth embodiment. In relation to the configuration in FIG. 1, this driving assistance system is configured such that the driving assistance device 100 is provided with a familiarity degree determining unit 105. The familiarity degree determining unit 105 analyzes characteristics of the operation of the automatic driving device 3 or the operation input device 4 (skillfulness) by the driver to determine the familiarity degree of the driver to the driving assistance device 100.

As a method for determining the familiarity degree of the driver, for example, a method of making determination on the basis of a response speed of the driver to the notification of the driving assistance device 100 can be considered.

While the driver, in a state where he or she is not accustomed to the driving assistance device 100, takes a long response time to the notification from the driving assistance device 100 (e.g., a time from reception of the request for the parking space selection to the selection by the driver, a time from the selection to the stepping-on of the accelerator, and so on), the time becomes shorter as the driver becomes more accustomed to the driving assistance device 100. Thus, when the response time of the driver is longer than a predetermined threshold value, it may be determined that the familiarity degree is low, so that the first notification sequence may be selected, while when the response speed of the driver is shorter than the relevant threshold value, it may be determined that the familiarity degree is high, so that the second notification sequence (or the third notification sequence) may be selected.

Moreover, as another method for determining the familiarity degree of the driver, for example, a method of making determination on the basis of a stepping-on amount of the accelerator by the driver during the automatic driving can be considered. While since the driver, in the state where he or she is not accustomed to the driving assistance device 100, steps on the accelerator timidly, the stepping-on amount of the accelerator is small, the stepping-on amount becomes larger as the driver becomes more accustomed to the driving assistance device 100. Thus, when the stepping-on amount of the accelerator by the driver is smaller than a predetermined threshold value, it may be determined that the familiarity degree is low, and the first notification sequence may be selected, while when the stepping-on amount of the accelerator by the driver is larger than the relevant threshold value, it may be determined that the familiarity degree is high, and the second notification sequence (or the third notification sequence) may be selected.

According to the present embodiment, necessity for selecting the notification sequence every time the driver changes is eliminated, which increases the convenience of the driving assistance device 100.

Seventh Embodiment

As in the sixth embodiment, when the familiarity degree to the driving assistance device 100 is found from the characteristics of the operation of the driver during the automatic driving, the driver needs to perform the operation for the automatic driving at least once, and thus, the familiarity degree cannot be determined immediately after the driver rides in the vehicle. In the present embodiment, the driving assistance device 100 is instantly enabled to determine the familiarity degree of the driver when the driver rides in the vehicle.

Figure 18:
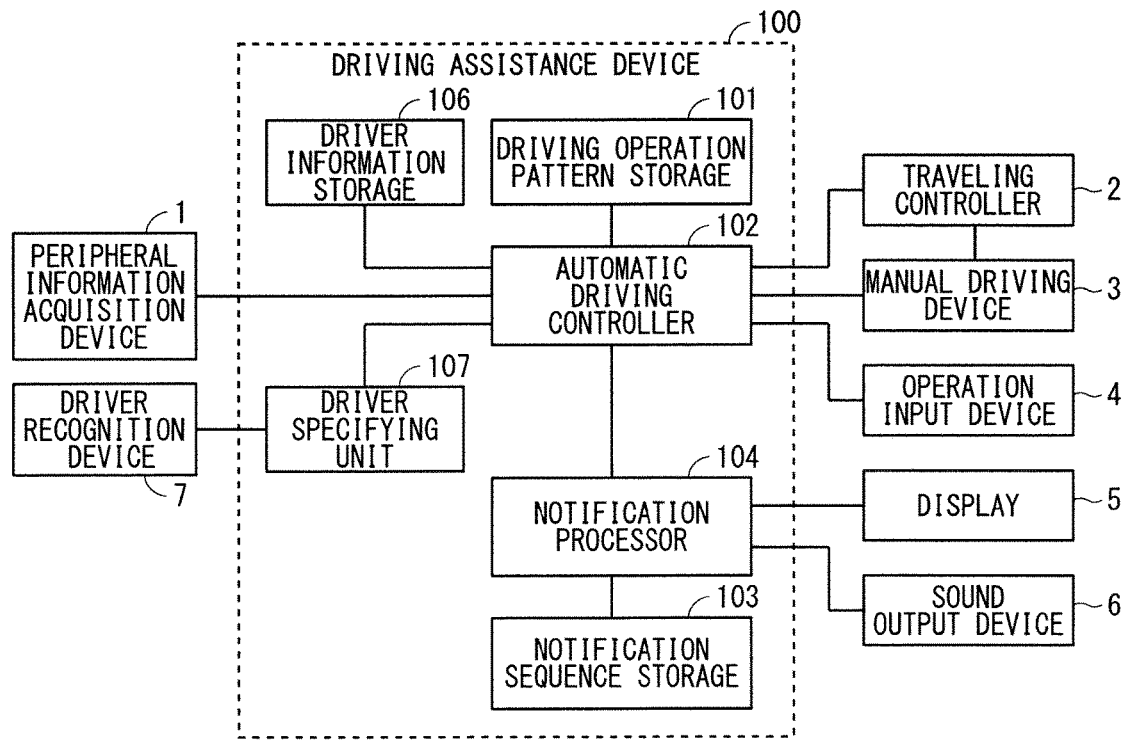
FIG. 18 is a block diagram showing a configuration of a driving assistance system according to a seventh embodiment.

FIG. 18 is a block diagram showing a configuration of a driving assistance system according to a seventh embodiment. In relation to the configuration in FIG. 1, this driving assistance system is configured such that a driver recognition device 7 is added, and that a driver information storage 106 and a driver specifying unit 107 are provided in the driving assistance device 100.

The driver recognition device 7 is a device configured to perform authentication of the driver of the subject vehicle. As a method for the authentication by the driver recognition device 7, a biometric authentication such as fingerprint authentication, face authentication and the like, individual authentication by a key with a communication function, an ID card, and a portable terminal, and so on can be considered.

The driver information storage 106 stores information of the familiarity degree to the driving assistance device 100 for each driver. Each driver beforehand registers his or her own familiarity degree in the driver information storage 106, using the operation input device 4. The driver specifying unit 107 specifies the current driver of the subject vehicle on the basis of an authentication result by the driver recognition device 7.

When the driver rides in the subject vehicle, the authentication of the driver by the driver recognition device 7 is performed. The driver specifying unit 107 specifies the current driver on the basis of the result of the authentication by the driver recognition device 7. The automatic driving controller 102 acquires the information of the familiarity degree of the specified current driver from the driver information storage 106. This allows the driver information storage 106 to determine the familiarity degree of the current driver, so that the notification sequence can be automatically selected in accordance with the familiarity degree. That is, when the familiarity degree of the current driver to the driving assistance device 100 is high, the notification sequence low in detail level is automatically selected.

According to the present embodiment, if the current driver is the driver registered in the driver information storage 106, the notification sequence need not be selected. This makes it unnecessary that the notification sequence is selected every time the driver changes, which increases the convenience of the driving assistance device 100.

Eighth Embodiment

Figure 19:
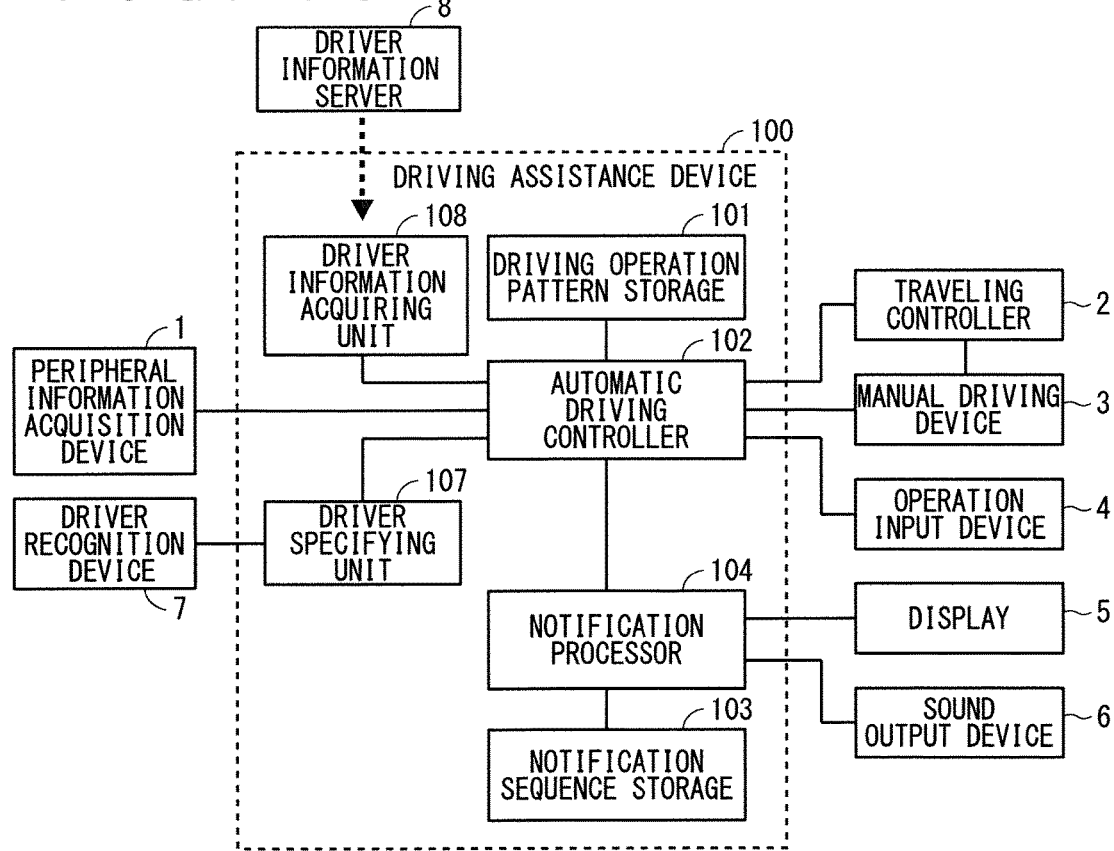
FIG. 19 is a block diagram showing a configuration of a driving assistance system according to an eighth embodiment.

FIG. 19 is a block diagram showing a configuration of a driving assistance system according to an eighth embodiment. In relation to the configuration in FIG. 18, this driving assistance system is configured such that a driver information server 8 is added, and the driver information storage 106 of the driving assistance device 100 is replaced by a driver information acquiring unit 108.

The driver information server 8 stores the information of the familiarity degree to the driving assistance device 100 for each driver, and the familiarity degree of each driver is transmitted in response to a request from the driver information acquiring unit 108. The familiarity degree of each driver needs to be beforehand registered in the driver information server 8. The driving assistance device 100 may be given a function of uploading the familiarity degree of the driver to the driver information server 8.

When the driver rides in the subject vehicle, the authentication of the driver by the driver recognition device 7 is performed. The driver specifying unit 107 specifies the current driver on the basis of the authentication result by the driver recognition device 7. The automatic driving controller 102 acquires the information of the familiarity degree of the specified current driver from the driver information server 8, using the driver information acquiring unit 108. This allows the driver information storage 106 to determine the familiarity degree of the current driver, so that the notification sequence can be automatically selected in accordance with the familiarity degree. That is, when the familiarity degree of the current driver to the driving assistance device 100 is high, the notification sequence low in detail level is automatically selected.

According to the present embodiment, if the driver is registered in the driver information server 8, the notification sequence need not be selected. This makes it unnecessary that the notification sequence is selected every time the driver changes, which increases the convenience of the driving assistance device 100. Moreover, even when the same driver changes to a non-subject vehicle equipped with the driving assistance device 100, the notification sequence need not be selected.

Moreover, in the case where a plurality of models of the driving assistance device 100 are supposed, the configuration may be such that what familiarity degree to each model each driver has can be registered in the driver information server 8. In this case, the driving assistance device 100 acquires the familiarity degree of the current driver to the same model as its own model. Thereby, even when the same driver changes to a non-subject vehicle equipped with a driving assistance device 100 of a different model, the proper notification sequence in accordance with the familiarity degree to the driving assistance device 100 is selected.

Ninth Embodiment

Figure 20:
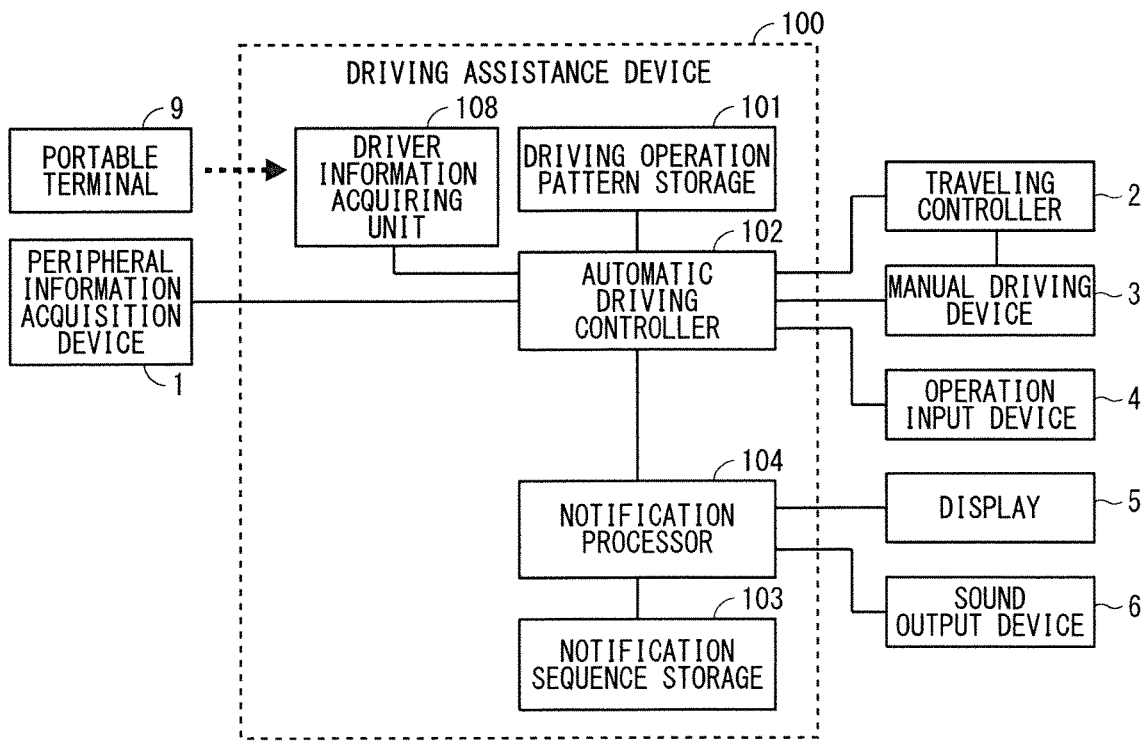
FIG. 20 is a block diagram showing a configuration of a driving assistance system according to a ninth embodiment.

FIG. 20 is a block diagram showing a configuration of a driving assistance system according to a ninth embodiment. In relation to the configuration in FIG. 1, this driving assistance system is configured such that a portable terminal 9 of the driver is added, and that the driving assistance device 100 is provided with the driver information acquiring unit 108 configured to perform communication with the portable terminal 9. In the portable terminal 9 is stored the information of the familiarity degree to the driving assistance device 100 of the driver who is an owner of the portable terminal 9. The portable terminal 9 transmits the familiarity degree of the driver who is an owner of the portable terminal 9 in response to a request from the driver information acquiring unit 108.

When the driver rides in the subject vehicle, the driver information acquiring unit 108 performs communication with the portable terminal 9 of the driver to acquire the information of the familiarity degree of the relevant driver. This enables the driver information storage 106 to determine the familiarity degree of the current driver, so that the notification sequence can be automatically selected in accordance with a determination result thereof. That is, when the familiarity degree of the current driver to the driving assistance device 100 is high, the notification sequence low in detail level is automatically selected.

According to the present embodiment, the notification sequence need not be selected every time the driver rides in the vehicle, which increases the convenience of the driving assistance device 100.

Moreover, in the case where a plurality of models of the driving assistance device 100 are supposed, the configuration may be such that what familiarity degree to each model the driver has can be registered in the portable terminal 9, the driver being an owner of the portable terminal 9. In this case, the driving assistance device 100 acquires the familiarity degree of the current driver to the same model as its own model. Thereby, even when the same driver changes to a non-subject vehicle equipped with a driving assistance device 100 of a different model, the proper notification sequence in accordance with the familiarity degree to the driving assistance device 100 is selected.

Tenth Embodiment

Figure 21:
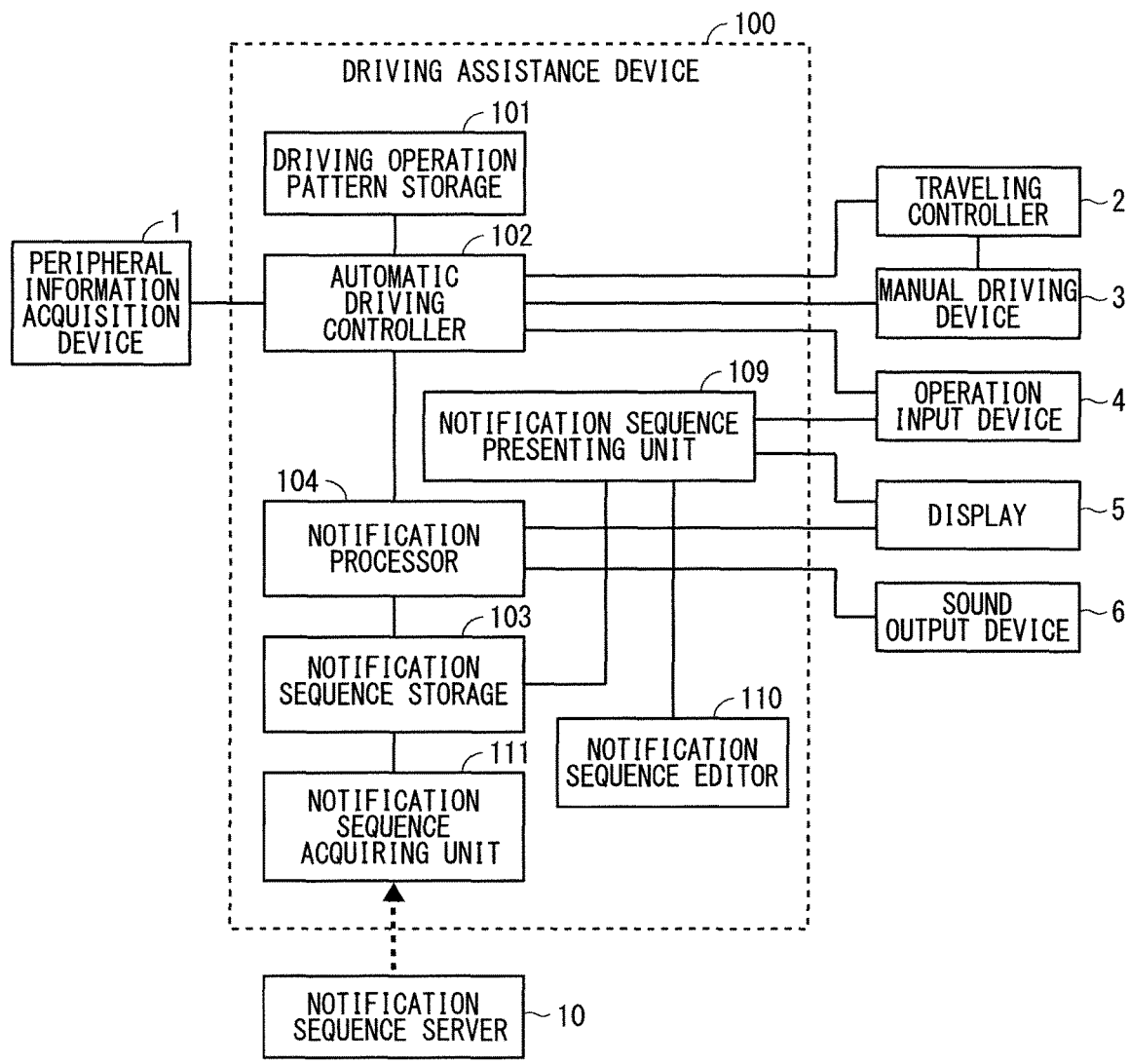
FIG. 21 is a block diagram showing a configuration of a driving assistance system according to a tenth embodiment.

FIG. 21 is a block diagram showing a configuration of a driving assistance system according to the tenth embodiment. In relation to the configuration in FIG. 1, this driving assistance system is configured such that a notification sequence server 10 is added, and the driving assistance device 100 is provided with a notification sequence presenting unit 109, a notification sequence editor 110, and a notification sequence acquiring unit 111.

The notification sequence presenting unit 109 can present, to the driver, the content of the notification sequence stored in the notification sequence storage 103 in response to a request of the driver, using the operation input device 4 and the display 5. The driver creates a new notification sequence using the notification sequence editor 110, and the notification sequence editor 110 can store the new created notification sequence in the notification sequence storage 103. The notification sequence acquiring unit 111 can download the new notification sequence from the notification sequence server 10 in response to an instruction of the driver.

FIGS. 22 to 34 show examples of various display screens in the driving assistance device 100 according to the tenth embodiment. Referring to these figures, actions of the notification sequence presenting unit 109 and the notification sequence editor 110 will be described. Here, the operation input device 4 is software keys displayed on a screen of the display 5 (i.e., the operation input device 4 and the display 5 configure a touch panel having the functions of both the devices).

When the driver performs specific operation, using the operation input device 4, a menu screen (a notification sequence menu) as in FIG. 22 is displayed on the display 5. In the notification sequence menu, a "Notification sequence change" button, a "Notification sequence reproduction" button, a "Notification sequence difference description" button, a "Notification sequence customization" button, and a "Notification sequence download" button are disposed.

When the driver touches the "Notification sequence change" button, the screen transitions to a notification sequence change screen as in FIG. 23, In the notification sequence change screen, a "Detailed notification sequence" button, a "Normal notification sequence" button, and a "Brief notification sequence" button are disposed. Here, the detailed notification sequence corresponds to the first notification sequence, the normal notification sequence corresponds to the second notification sequence, and the brief notification sequence corresponds to the third notification sequence. The driver can select one of these three types of notification sequences by touching any of these three buttons.

When the driver touches the "Notification sequence reproduction" button in the notification sequence menu in FIG. 22, the notification sequence set currently is reproduced as shown in FIG. 7A to 7F, 8A to 8F or 11A to 11F, using the display 5 and the sound output device 6. This reproduction operation is not to actually perform the automatic driving, but for the driver to beforehand check the content of the notification sequence menu. Alternatively, when the driver touches the "Notification sequence reproduction" button, a description of each of the steps of the notification sequence set currently may be sequentially outputted in text or in voice.

When the driver touches the "Notification sequence difference description" button in the notification sequence menu in FIG. 22, the screen transitions to a menu screen of the notification sequence difference description as in FIG. 24. In the relevant menu screen, a "Detail→Normal" button and a "Normal→Brief" button are disposed.

When the driver touches the "Detail→Normal" button, a notification sequence comparison screen showing differences between the detailed notification sequence (the first notification sequence) and the normal notification sequence (the second notification sequence) is displayed as in FIG. 25.

Figure 26:
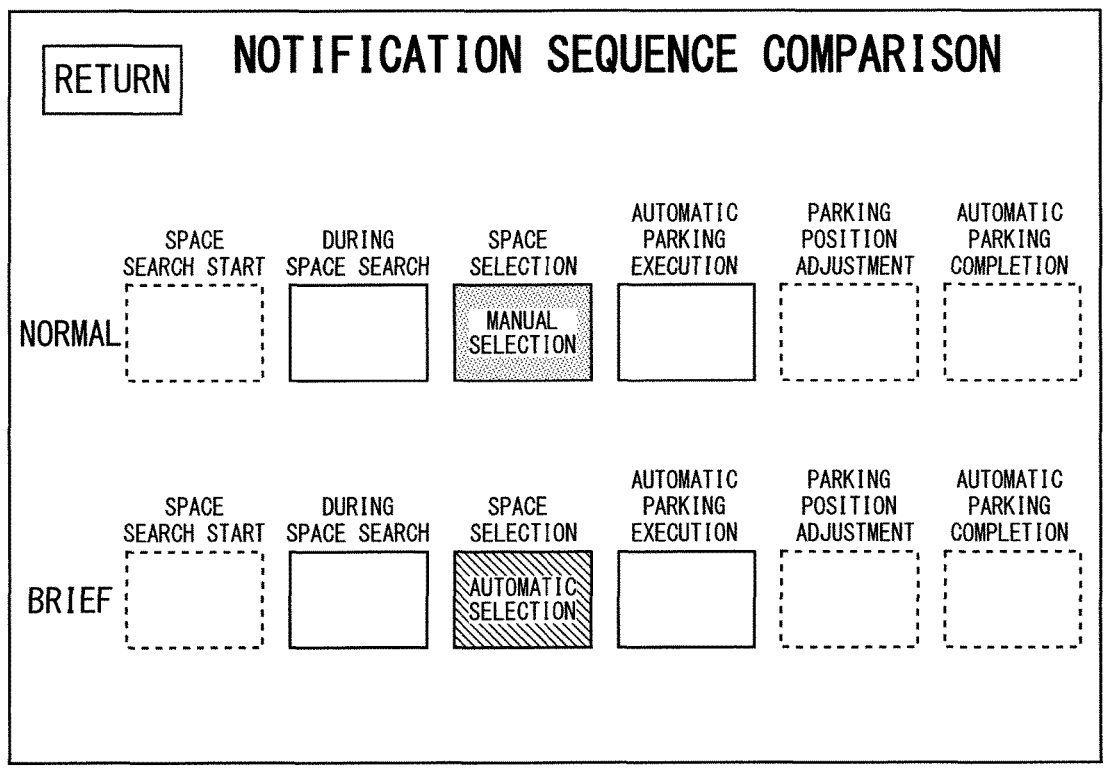
FIG. 26 is a diagram showing an example of the notification sequence comparison screen.

On the other hand, when the driver touches the "Normal→Brief" button, a notification sequence comparison screen showing differences between the normal notification sequence (the second notification sequence) and the brief notification sequence (the third notification sequence) are displayed as in FIG. 26. In the screens in FIGS. 25 and 26, the steps large in difference of the display and the steps different in content of the automatic driving are highlighted (or colored and displayed), by which the differences between the two notification sequences are represented. Moreover, the steps not screen-displayed are indicated by broken line.

Figure 27:
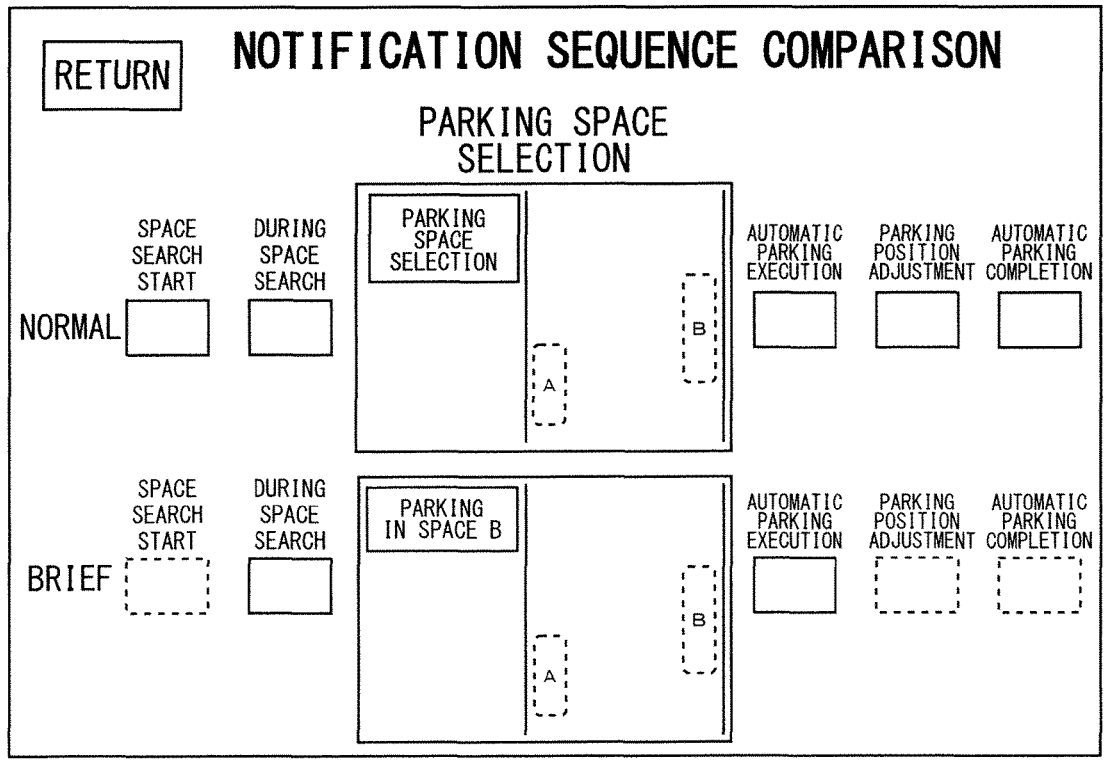
FIG. 27 is a diagram showing an example of the notification sequence comparison screen.
Figure 28:
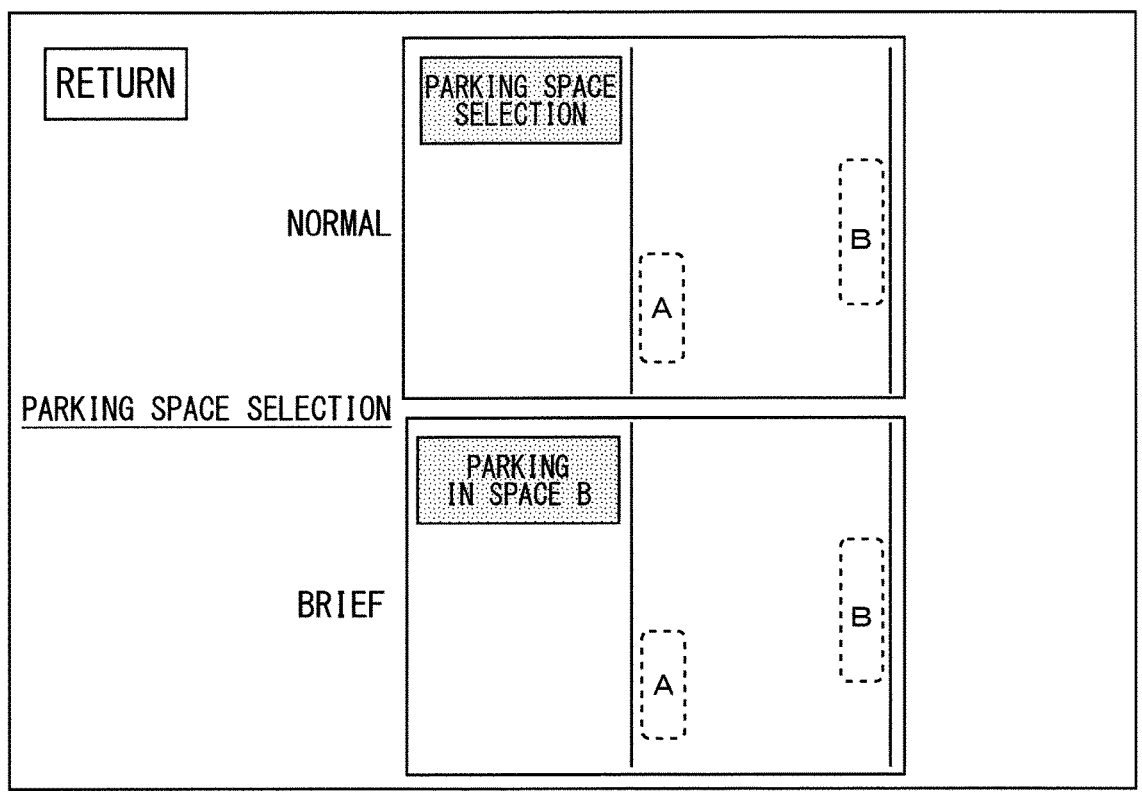
FIG. 28 is a diagram showing an example of the notification sequence comparison screen.

Furthermore, in the screens in FIG. 25 or 26, touching a position of each of the steps may allow reduced images of the screens to be displayed so that the screens of the relevant step (here, the step of the parking space selection) can be compared in the two types of notification sequences as in FIG. 27 or 28. In FIGS. 27 and 28, the reduced images of the screens may be images obtained by reducing the actual screens as they are, or may be images obtained by deforming characteristic portions of the screens.

While here, change of the sound output between the two notification sequences has not been referred to, differences in sound output in the two notification sequences may also be enabled to be indicated in text or in voice for each of the steps.

Referring back to FIG. 22, when the driver touches the "Notification sequence customization" button in the notification sequence menu, the notification sequence editor 110 is activated. In this case, the driver edits the content of the notification sequence to create a new notification sequence.

When the notification sequence editor 110 is activated, as in FIG. 29A, a display screen in the step of parking space search start, and an edit panel configured by a "Return" button, a "Next" button, and a "Customize" button are displayed on the display 5, and the sound outputted in the relevant step is outputted from the sound output device 6. When the driver touches the "Customize" button, the screen transitions to a selection screen of sound or an image as in FIG. 29B. If the driver selects the sound, the screen transitions to a sound selection/input screen as in FIG. 29C, so that the driver can customize the sound output in the relevant step. If the driver selects the image, the screen transitions to an image selection/input screen as in FIG. 29D, so that the driver can customize the image output in the relevant step.

When the driver touches the "Next" button as in FIG. 29A or 29B, as in FIG. 30A, the display screen in the step of the parking space search and the edit panel are displayed on the display 5, and the sound outputted in the relevant step is outputted from the sound output device 6. When the driver touches a "Customize" button, the screen transitions to a selection screen of the sound or the image as in FIG. 30B. If the driver selects the sound, the screen transitions to a sound selection/input screen as in FIG. 30C, so that the driver can customize the sound output in the relevant step. If the driver selects the image, the screen transitions to an image selection/input screen as in FIG. 30D, so that the driver can customize the image output in the relevant step.

When the driver touches a "Next" button in FIG. 30A or 30B, as in FIG. 31A, the display screen in the step of the parking space selection and the edit panel are displayed on the display 5, and the sound outputted in the relevant step is outputted from the sound output device 6. When the driver touches a "Customize" button, the screen transitions to a selection screen of the sound or the image as in FIG. 31B. If the driver selects the sound, the screen transitions to a sound selection/input screen as in FIG. 31C, so that the driver can customize the sound output in the relevant step.

If the driver selects the image, the screen transitions to an image selection/input screen as in FIG. 31D, so that the driver can customize the image output in the relevant step.

When the driver touches a "Next" button in FIG. 31A or 31B, as in FIG. 32A, the display screen in the step of carrying out the automatic parking and the edit panel are displayed on the display 5, and the sound outputted in the relevant step is outputted from the sound output device 6. When the driver touches a "Customize" button, the screen transitions to a selection screen of the sound or the image as in FIG. 32B. If the driver selects the sound, the screen transitions to a sound selection/input screen as in FIG. 32C, so that the driver can customize the sound output in the relevant step. If the driver selects the image, the screen transitions to an image selection/input screen as in FIG. 32D, so that the driver can customize the image output in the relevant step.

When the driver touches a "Next" button in FIG. 32A or 32B, as in FIG. 33A, the display screen in the step of carrying out the automatic parking and the edit panel are displayed on the display 5, and the sound outputted in the relevant step is outputted from the sound output device 6. When the driver touches a "Customize" button, the screen transitions to a selection screen of the sound or the image as in FIG. 33B. If the driver selects the sound, the screen transitions to a sound selection/input screen as in FIG. 33C, so that the driver can customize the sound output in the relevant step. If the driver selects the image, the screen transitions to an image selection/input screen as in FIG. 33D, so that the driver can customize the image output in the relevant step.

When the driver touches a "Next" button in FIG. 33A or 33B, as in FIG. 34A, the display screen in the step of carrying out the automatic parking and the edit panel are displayed on the display 5, and the sound outputted in the relevant step is outputted from the sound output device 6. When the driver touches a "Customize" button, the screen transitions to a selection screen of the sound or the image as in FIG. 34B. If the driver selects the sound, the screen transitions to a sound selection/input screen as in FIG. 34C, so that the driver can customize the sound output in the relevant step. If the driver selects the image, the screen transitions to an image selection/input screen as in FIG. 34D, so that the driver can customize the image output in the relevant step.

When the driver touches the "Next" button in FIG. 34A or 34B, the customization of the notification sequence is completed, and the processing returns to the notification sequence menu in FIG. 22. The notification sequence editor 110 causes the notification sequence storage 103 to store the new customized notification sequence. At this time, the notification sequence before the customization may be replaced by the new notification sequence, or the new notification sequence may be stored separately from the notification sequence before the customization. The driver can make setting so that the new customized notification sequence is selected by the notification processor 104. Moreover, when the new notification sequence is stored separately from the notification sequence before the customization, setting can also be made so that the notification sequence before the customization is reselected.

Moreover, referring back to FIG. 22, when the driver touches the "Notification sequence download" button in the notification sequence menu, the notification sequence acquiring unit 111 is activated. The notification sequence acquiring unit 111 requests transmission of the new notification sequence to the notification sequence server 10. If the new notification sequence exists, the notification sequence server 10 transmits it to the notification sequence acquiring unit 111.

When the new notification sequence is transmitted from the notification sequence server 10, the notification sequence acquiring unit 111 receives it and causes the notification sequence storage 103 to store it. At this time, the old notification sequence is replaced by the new notification sequence, or the new notification sequence may be stored separately from the old notification sequence. The driver can make setting so that the new notification sequence received from the notification sequence server 10 is selected by the notification processor 104. Moreover, when the new notification sequence is stored separately from the old notification sequence, setting can also be made so that the old notification sequence is reselected.

In this manner, according to the driving assistance device 100 according to the tenth embodiment, the driver can easily perform the selection, the check, the editing, the update and the like of the notification sequence. Here, while the configuration has been described in which in relation to the driving assistance system in the first embodiment (FIG. 1), the notification sequence server 10, the notification sequence editor 110, and the notification sequence acquiring unit 111 are provided, the present embodiment may be applied to the driving assistance system in each of the second to ninth embodiments.

In the present invention, the respective embodiments can be freely combined, and can be modified or omitted as needed within the scope of the invention.

While the present invention has been described in detail, the above description is illustrative in all aspects, and the present invention is not limited thereto. It should be understood that numerous modifications not illustrated can be supposed without deviating from the scope of the present invention.

REFERENCE SIGNS LIST

1: peripheral information acquisition device
2: traveling controller
3: manual driving device
4: operation input device
5: display
51: first display
52: second display
6: sound output device
7: driver recognition device
8: driver information server
9: portable terminal
10: notification sequence server
100: driving assistance device
101: driving operation pattern storage
102: automatic driving controller
103: notification sequence storage
104: notification processor
105: familiarity degree determining unit
106: driver information storage
107: driver specifying unit
108: driver information acquiring unit
109: notification sequence presenting unit
110: notification sequence editor
111: notification sequence acquiring unit
40: processing circuit
41: processor
42: memory

The invention claimed is:

1. A driving assistance device comprising:
a processor to execute a program; and
a memory to store the program for performing, when being executed by the processor, following processes of:
performing automatic driving of a vehicle in accordance with a predetermined driving operation pattern; and
performing notification to a driver of the vehicle in accordance with notification sequence corresponding to the driving operation pattern, wherein
a plurality of notification sequences different in detail level for one driving operation pattern is stored in the driving assistance device, and
when the processor performs automatic driving in accordance with the driving operation pattern, the processor selects one of the plurality of notification sequences corresponding to the relevant driving operation pattern, and performs notification to the driver in accordance with the selected notification sequence in conformity with a progress of the relevant driving operation pattern in the automatic driving.

2. The driving assistance device according to claim 1, wherein
in the plurality of notification sequences, the notification sequence low in detail level results from simplifying or omitting a notification content or an input request content to the driver with respect to the notification sequence high in detail level.

3. The driving assistance device according to claim 1, wherein
the processor changes a content of the automatic driving or a control parameter of the automatic driving in accordance with the selected notification sequence.

4. The driving assistance device according to claim 3, wherein
when the processor selects the notification sequence low in detail level, the processor automatically performs more of a plurality of driving operations configuring the driving operation pattern than those when the processor selects the notification sequence high in detail level.

5. The driving assistance device according to claim 3, wherein
when the processor selects the notification sequence low in detail level, the processor makes an automatic steering speed of the vehicle higher than that when the processor selects the notification sequence high in detail level.

6. The driving assistance device according to claim 3, wherein
when the processor selects the notification sequence low in detail level, the processor makes an allowable value of a distance from the vehicle to an obstacle smaller than that when the processor selects the notification sequence high in detail level.

7. The driving assistance device according to claim 1, wherein
the processor can use a plurality of notification devices, and changes the notification device to be used for the notification to the driver in accordance with the selected notification sequence.

8. The driving assistance device according to claim 1, wherein
the notification sequence to be selected by the processor can be set by the driver.

9. The driving assistance device according to claim 1, wherein the processor determines a familiarity degree of the driver to the relevant driving assistance device, and the processor selects the notification sequence lower in detail level as the familiarity degree is higher.

10. The driving assistance device according to claim 9, wherein the processor determines the familiarity degree of the driver to the relevant driving assistance device on the basis of a response speed of the driver to the notification, or a stepping-on amount of an accelerator by the driver during the automatic driving.

11. The driving assistance device according to claim 1, wherein a familiarity degree to the relevant driving assistance device for each driver is stored in the driving assistance device, the processor specifies a current driver, and the processor selects the notification sequence lower in detail level as the familiarity degree of the current driver to the relevant driving assistance device is higher.

12. The driving assistance device according to claim 1, wherein the processor specifies a current driver, acquires a familiarity degree of the current driver to the relevant driving assistance device from a driver information server by communication, and selects the notification sequence lower in detail level as the familiarity degree of the current driver to the relevant driving assistance device is higher.

13. The driving assistance device according to claim 1, wherein the processor acquires a familiarity degree of a current driver to the relevant driving assistance device by communication with a portable terminal of the relevant current driver, and selects the notification sequence lower in detail level as the familiarity degree of the current driver to the relevant driving assistance device is higher.

14. The driving assistance device according to claim 1, wherein the processor presents, to the driver, a difference between the respective notification sequences stored in the driving assistance device.

15. The driving assistance device according to claim 1, wherein the processor can cause the driving assistance device to store a new notification sequence created by the driver.

16. The driving assistance device according to claim 1, wherein the processor can acquire a new notification sequence from a notification sequence server by communication, and can cause the driving assistance device to store the new notification sequence.

* * * * *